United States Patent [19]

Tanaka et al.

[11] Patent Number: 5,787,282
[45] Date of Patent: Jul. 28, 1998

[54] CONTROL PROGRAM DESIGNING SUPPORT APPARATUS

[75] Inventors: Makoto Tanaka; Kinya Ogino; Tetsuo Yamasaki, all of Hyogo, Japan

[73] Assignee: Mitsubishi Denki Kabushiki Kaisha, Tokyo, Japan

[21] Appl. No.: 278,625

[22] Filed: Jul. 21, 1994

[30] Foreign Application Priority Data

Dec. 10, 1993 [JP] Japan .................................. 5-310888

[51] Int. Cl.$^6$ ............................................. G06F 9/44
[52] U.S. Cl. ........................ 395/701; 395/702; 395/191
[58] Field of Search ...................... 395/700, 701, 395/702, 703; 364/191, 130, 140, 141, 143, 147, 188, 192

[56] References Cited

U.S. PATENT DOCUMENTS

| | | | |
|---|---|---|---|
| 4,736,340 | 4/1988 | Desserrieres | 364/900 |
| 4,823,255 | 4/1989 | Tanaka et al. | 364/191 |
| 5,043,644 | 8/1991 | Sasaki et al. | 318/568.23 |
| 5,481,716 | 1/1996 | Morshedi et al. | 395/700 |
| 5,485,620 | 1/1996 | Sadre et al. | 395/700 |
| 5,493,727 | 2/1996 | Ohya | 395/800 |

FOREIGN PATENT DOCUMENTS 50224706  9/1993  Japan .

OTHER PUBLICATIONS

Shimokawa "Sequence Control Engineering" Institute of Electrical Engineers Nov. 20, 1988.

*Primary Examiner*—Edward R. Cosimano
*Assistant Examiner*—Kakali Chaki
*Attorney, Agent, or Firm*—Wolf, Greenfield & Sacks, P.C.

[57] ABSTRACT

A control program designing support apparatus for searching, on the basis of searching data selected by selecting means, program parts for realizing the contents of the control for controlling each controlled subject; for searching, for each of the controlled subjects, program parts peculiar to controlled subject and for realizing the contents of the control without influencing on the control of the other controlled subjects, and for hierarchically combining the searched program parts, thereby, even the control conditions of two controlled subjects are interrelated, the contents of the control peculiar to the controlled subject can be handled as one module.

11 Claims, 25 Drawing Sheets

⌐ : LOGICAL PRODUCT

⌐ : LOGICAL SUM

⊠ : NOT

# CONTROL PROGRAM DESIGNING SUPPORT APPARATUS

BACKGROUND OF THE INVENTION (1) Field of the Invention

The present invention relates to a control program designing support apparatus for preparing a control program for controlling a machine such as a pump or a valve.

(2) Description or the Related Art

FIG. 1 is a construction diagram showing a conventional control program designing support apparatus. In the figure, reference numeral 1 is an input unit for inputting an edit command of program parts, and 2 is an input unit interface for sending the edit command inputted from the input unit 1 to a program data managing unit 4. Reference numeral 3 is a storage unit for storing program parts of respective module levels in a Sequence Flow Chart (SFC), and 4 is the program data managing unit for combining, in accordance with the edit command inputted from the input unit 1, the program parts stored in the storage unit 3 so as to prepare a control program, 5 is a display unit interface, and 6 is a display unit.

Reference number 7 is a converting unit for converting the control program prepared by the program data management unit 4 into an executable program, 8 is a programmable controller for executing the executable program obtained by the converting unit 7, and 9 is a subject to be controlled by the programmable controller 8.

Next, the operation of the conventional apparatus shown in FIG. 1 will be described.

First, a program designer handles the input unit 1 to display, on the display unit 6, a menu of the program parts stored in the storage unit 3.

Here, the program designer selects necessary program parts by means of the input unit 1, and instructs a combining relationship and so forth of the selected program parts.

Thereby the program data managing unit 4 reads the selected program parts from the storage unit 3 in accordance with the instruction from the input unit 1 so as to carry out a combining process and so forth to prepare a control program.

Then, the prepared control program is converted by the converting unit 7 into an executable program. The program controller 8 then executes the executable program to control the subject 9 to be controlled.

Thus, the apparatus shown in FIG. 1 combines program parts in respective module levels of the SFC to prepare a program. Each module in the SFC, however, has a characteristic in that it can not be independently separated as a module until the operations defined in the module are completely finished. For example, as shown in FIG. 2, let assume a condition in which a start and a stop of a pump B are carried out only after a start and a stop of a pump A are completely finished. In this case, the start and the stop of the pump A can be deemed as one module A; and the start and the stop of the pump B can be deemed as another module B. A control program can be prepared by combining the program parts in the modules A and B.

Accordingly, there is the following problem in the apparatus shown in FIG. 1. Namely, as shown in FIG. 3, for example, in case when the pump B is started before completely finishing the start and the stop of the pump A so that the start and stop conditions of the pumps A and B interrelates to each other, the start and the stop of one pump can not be deemed as one module, but each of the starts and the stops of the pumps A and B must be deemed as one module.

Accordingly, in case of FIG. 3, a control program can be prepared only when the program parts in the four modules are combined, raising a problem in that the performance of the recycle of the module is lowered.

Other than the above-described conventional example, there is known a Japanese Patent Laid Open Publication (Kokai) No. 5-224706 (224706/93) disclosing an apparatus for preparing a control program by using the SFC. This publication discloses an apparatus for automatically generating a control program corresponding to the construction of a machine to be controlled, by inputting an object operation relating to the specification of the function of the subject to be controlled. Therefore, the apparatus disclosed in this publication also has the same problem as above. In the following, a subject to be controlled is simply referred to as a controlled subject.

Since the conventional control program designing support apparatus is constructed as described above, when the control conditions of, for example, two controlled subjects are interrelated to each other, the contents of the control for each controlled subject cannot be deemed as one module even when the contents of the control for the controlled subject are registered as program parts in for example the module A or B in FIG. 2, so that there are problems in that the performance of the recycle of the modules or the program parts is lowered, and the preparing of the program becomes complex.

SUMMARY OF THE INVENTION

In view of the foregoing, it is an object of the first aspect of the present invention to provide a control program designing support apparatus which can handle the contents of the control for each controlled subject as one module even when the control conditions of two controlled subjects are interrelated to each other.

Another object according to the second aspect of the present invention is to provide a control program designing support apparatus which can handle a plurality of controlled subjects as one controlled subject so as to be able to improve the performance of recycling of a program.

Still another object according to the third aspect of the present invention is to provide a control program designing support apparatus which can verify a control logic of a prepared program.

Still another object according to the fourth aspect of the present invention is to provide a control program designing support apparatus which can express a verified result of a control logic of a prepared program by a time chart.

Still another object according to the fifth aspect of the present invention is to provide a control program designing support apparatus which can express a verified result of a control logic of a prepared program by a point on a plural time axes coordinate plane.

Still another object according to the sixth aspect of the present invention is to provide a control program designing support apparatus which can ascertain a change of an operating state of a controlled subject.

Still another object according to the seventh aspect of the present invention is to provide a control program designing support apparatus which can verify the contents of control by logic diagram levels, can correct the contents of control in accordance with necessity, and can prepare a new program part which has not been registered.

Still another object according to the eighth aspect of the present invention is to provide a control program designing support apparatus which can register program parts so that the performance of recycling a program can be improved.

Still another object according to the ninth aspect of the present invention is to provide a control program designing support apparatus which can register program parts so that the performance of modules for a program can be improved.

Still another object according to the tenth aspect of the present invention is to provide a control program designing support apparatus which can prepare new program parts that have not yet been registered.

Still another object according to the eleventh aspect of the present invention is to provide a control program designing support apparatus which can execute the prepared program so as to able to be directly applied to a practical machine.

According to the first aspect of the present invention, for achieving the above object, there is provided a control program designing support apparatus for searching, on the basis of searching data selected by selecting means, program parts for realizing the contents of the control for controlling each controlled subject, for searching, for each of the controlled subjects, program parts peculiar to the controlled subject and for realizing the contents of the control without influencing on the control of the other controlled subjects, and for hierarchically combining the searched program parts, thereby, the performance of the recycle of the program parts is improved and the preparation of the program becomes easy.

According to the second aspect of the present invention, there is provided a control program designing support apparatus in which, when data indicating that a plurality of controlled subjects selected by the selecting means should be handled as one controlled subject is inputted from the selecting means, the plurality of controlled subjects are deemed as one controlled subject, and the program parts for realizing the contents of the control peculiar to the controlled subject are searched, thereby the performance of recycling a program can be improved.

According to the third aspect of the present invention, there is provided a control program designing support apparatus comprising timing evaluation means for recognizing, on the basis of the program parts combined by the program parts combining means, the logic of the contents of the control to be realized by the program parts, for recognizing a logical connecting relationship of logic operators constructing the logic, and for evaluating the operating time of each of the logic operators on the basis of the logical connecting relationship, thereby the prepared program control logic can be verified.

According to the fourth aspect of the present invention, there is provided a control program designing support apparatus for displaying, by using a time chart, the evaluation resulted by the timing evaluation means, thereby the verified result of the control logic of the prepared program can be expressed by a time chart.

According to the fifth aspect of the present invention, there is provided a control program designing support apparatus for displaying the evaluation resulted by the timing evaluation means as a point on a plural time axes coordinate plane consisting of two time axes representing an operation start time and an operation stop times respectively, thereby the verified result of the control logic of the prepared program can be displayed on the plural time axes coordinate plane.

According to the sixth aspect of the present invention, there is provided a control program designing support apparatus for recognizing, on the basis of the evaluation resulted by the timing evaluating means, times of start and stop of the operation in each of the controlled subjects, and for displaying a transition of a state of each of the controlled subjects in accordance with the recognized times, thereby the change of the operating state of the controlled subject can be ascertained.

According to the seventh aspect of the present invention, there is provided a control program designing support apparatus for displaying, as a logic diagram, the contents of the control of the program parts searched by the program parts managing means, for receiving a correction requirement to correct the contents of the control, and for correcting the contents of the control in accordance with the correction requirement if any, thereby the contents of the control can be verified by a logic diagram level, and the contents of the control can be corrected in accordance with the necessity.

According to the eighth aspect of the present invention, there is provided a control program designing support apparatus wherein the program parts managing means registers the program parts which realize the contents of the control corrected by the editing means, thereby the performance of recycling a program can be improved.

According to the ninth aspect of the present invention, there is provided a control program designing support apparatus wherein the program parts managing means registers the program parts that are combined by the program parts combining means, thereby the performance of recycling a program can be improved.

According to the tenth aspect of the present invention, there is provided a control program designing support apparatus for preparing the program parts on the basis of points on a plural time axes coordinate plane inputted by plural time axes coordinate plane inputting means, thereby new program parts which have not yet been registered can be prepared.

According to the eleventh aspect of the present invention, there is provided a control program designing support apparatus for executing the executable text program obtained by the conversion by the program converting means, thereby the program can be directly applied to a practical machine.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

In the following, an embodiment of the present invention will be described.

Figure 4:
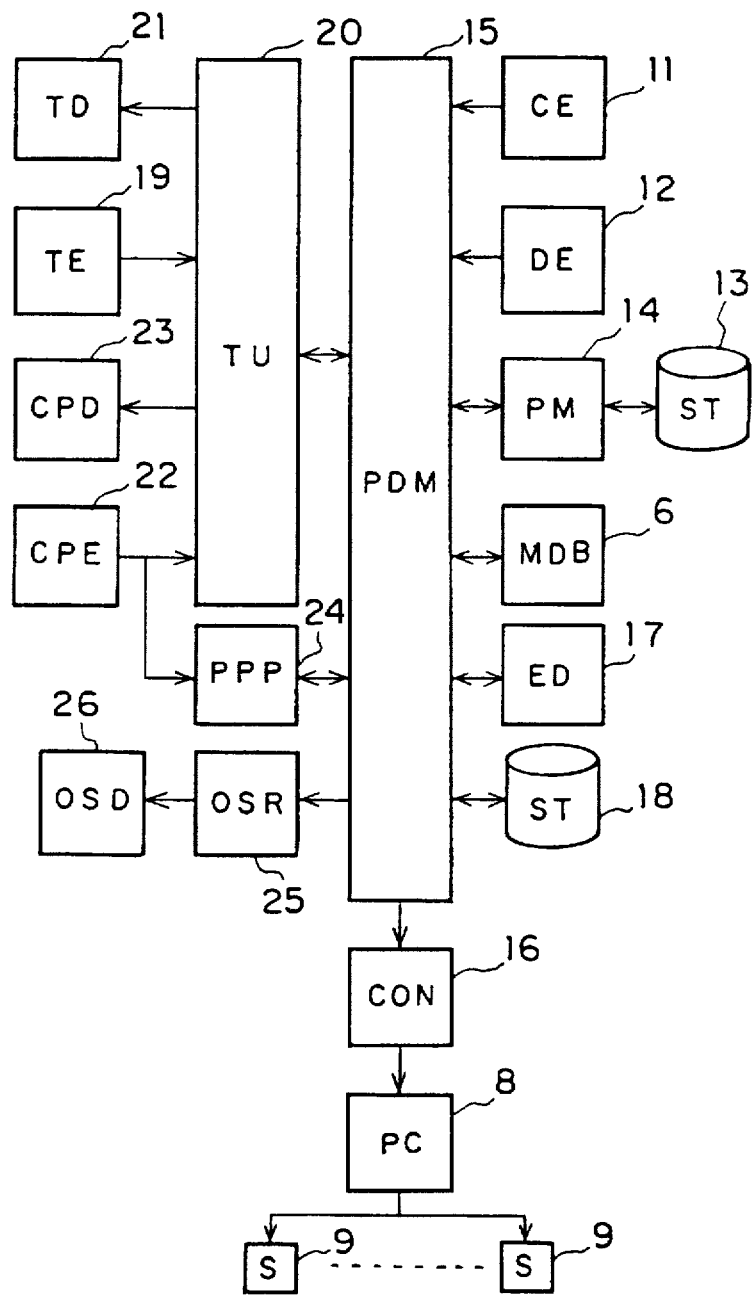
FIG. 4 is a construction diagram showing a control program designing support apparatus according to an embodiment of the present invention.

FIG. 4 is a construction diagram showing a control program designing support apparatus according to an embodiment of the present invention. In the figure, the same reference symbols as those in the conventional ones represent the same or corresponding parts, and therefore the explanations thereof are omitted here.

Reference numeral 11 is a command entering unit (CE) for entering commands for directly operating a program data managing unit (PDM) 15.

Reference numeral 12 is a data entering unit (DE) for entering data of required specification level (for example, a "priority control" or a "type of a switch"), instead of entering a command for directly operating the program data managing unit 15. The command entering unit 11 and the data entering unit 12 constitute selecting means for selecting one or more subjects 9 to be controlled, and for selecting searching data for determining the contents of the control for controlling each subject 9 to be controlled.

Reference numeral 13 is a storage unit (ST) for storing program parts.

Reference numeral 14 is a program parts managing unit (PM) for searching, based on the searching data selected by the command entering unit 11 or the data entering unit 12 and from the storage unit 13, program parts which realize a process according to the contents of the control of the respective subjects 9 to be controlled, and for searching, from the storage unit 13 and for each subject to be controlled, program parts that realize a process according to the contents of the control which are peculiar to the said subject to be controlled and which do not influence on the control of the other subjects 9 to be controlled.

Reference numeral 15 is a program data managing unit (PDM) for hierarchically combining the respective program parts searched by the program parts managing unit 14.

Reference numeral 16 is a program converting unit (CON) for converting the program parts combined by the program data managing unit 15 into an executable level text program.

Reference numeral 17 is an editing unit (ED) for displaying the contents of the control of the program parts searched by the program parts managing unit 14, for receiving a correction requirement of the contents of the control, and for correcting the contents of the control according to the correction requirement if any.

Reference numeral 18 is a storage unit (ST) for storing designing data.

Reference numeral 19 is a time chart entering unit (TE) for entering an evaluating condition into a timing evaluating unit (TU) 20.

The timing evaluating unit 20 recognizes, on the basis of the program parts combined by the program data managing unit 15, the logic of the contents of the control to be realized by the program parts, so as to recognize the logical connecting relationship of the logic operators constituting the logic, to evaluate the operating time of each logic operator on the basis of the logical connecting relationship.

Reference numeral 21 is a time chart display unit (TD) for displaying the evaluated result from the timing evaluating unit 20 by using a time chart.

Reference numeral 22 is a plural time axes coordinate plane entering unit (CPE) for entering a start time and a stop time of the subject 9 to be controlled as points on a plural time axes coordinate plane.

Reference numeral 23 is a plural time axes coordinate display unit (CPD) for displaying the evaluated result from the timing evaluating unit 20 as points on the plural time axes coordinate plane consisting of two time axes representing the operation start time and the operation stop time.

Reference numeral 24 is a program parts preparing unit (PPP) for preparing the program parts on the basis of the points on the plural time axes coordinate plane entered by the plural time axes coordinate plane entering unit 22.

Reference numeral 25 is an operating state recognizing unit (OSR) for recognizing the times of the start and the stop of operation in each subject to be controlled on the basis of the evaluated result from the timing evaluating unit 20.

Reference numeral 26 is an operating state display unit (OSD) for displaying a transition of an operating state of each subject to be controlled in accordance with the time recognized by the operating state recognizing unit 25.

The operating state recognizing unit 25 and the operating state display unit 26 constitute operating state display means.

Figure 5:
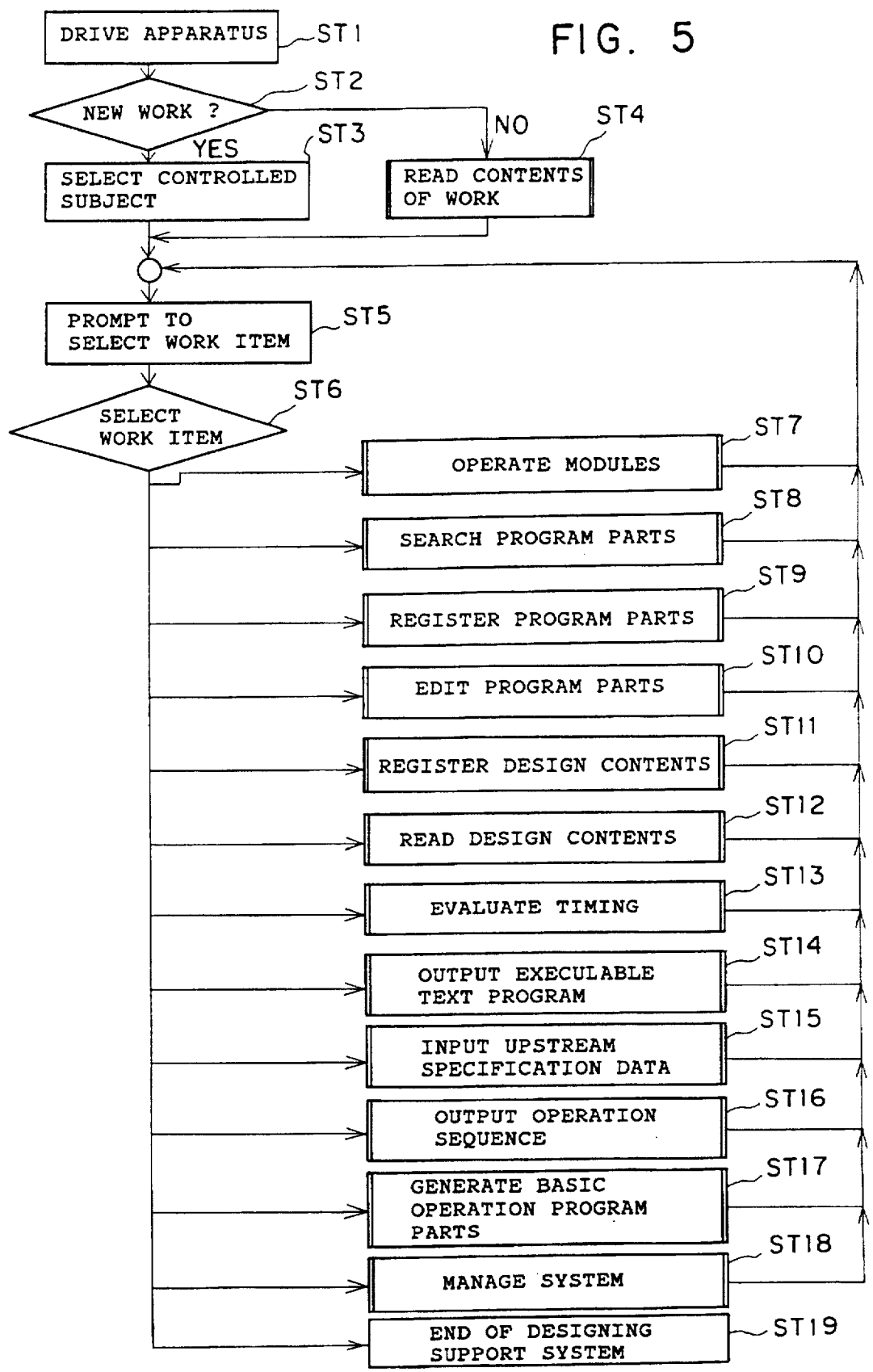
FIG. 5 is a flow chart explaining the operation of the control program designing support apparatus according to an embodiment of the present invention.

Next, the operation of the apparatus shown in FIG. 4 will be described. In this connection, FIG. 5 is a flow chart explaining the operation of the control program designing support apparatus according to an embodiment of the present invention.

First, when the control program designing support apparatus (herein after referred to as a designing support apparatus) is started (step ST1), a prompt is displayed on the display unit 6 as to whether a new program design is to be carried out or a program design which has been carried out halfway but has been interrupted is to be restarted (step ST2). In this example, it is assumed that a program designer selects, by means of the data entering unit 12, to design a new program.

Thereby, the designing support apparatus prompts to select subjects 9 to be controlled (herein after referred to as controlled subjects) as the subjects for the program design so that the program designer selects the subjects 9 to be controlled by means of the data entering unit 12 (step ST3).

Figure 6:
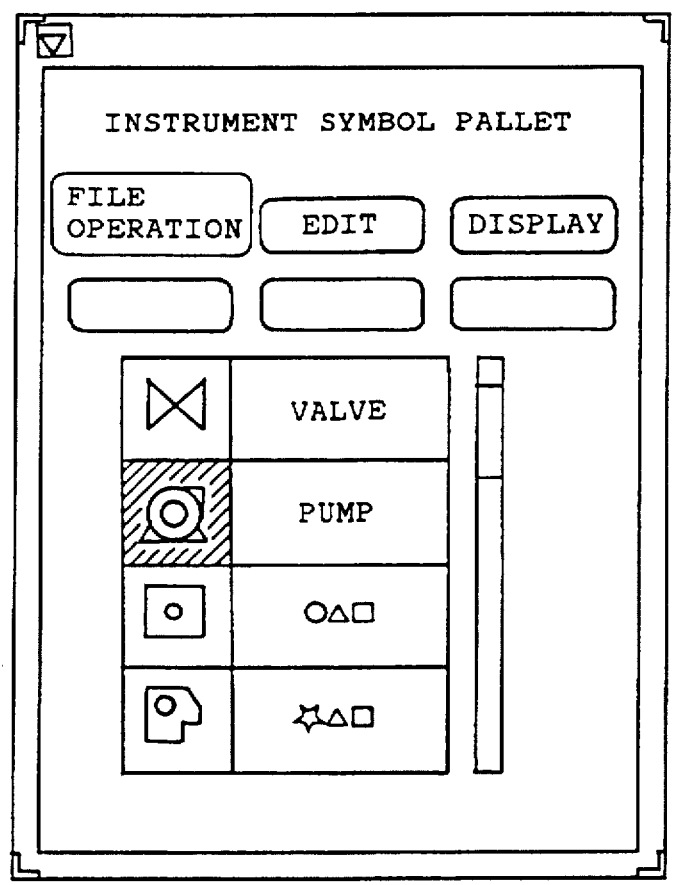
FIG. 6 is a diagram showing a picture of a menu for selecting a select to be controlled.

That is, on the display unit 12, a picture of a menu as shown in FIG. 6 is displayed, and the program designer clicks the symbols indicating the controlled subjects 9. In the following description, it is assumed in this embodiment that two pumps and two valves are selected as the controlled subjects.

Figure 7:
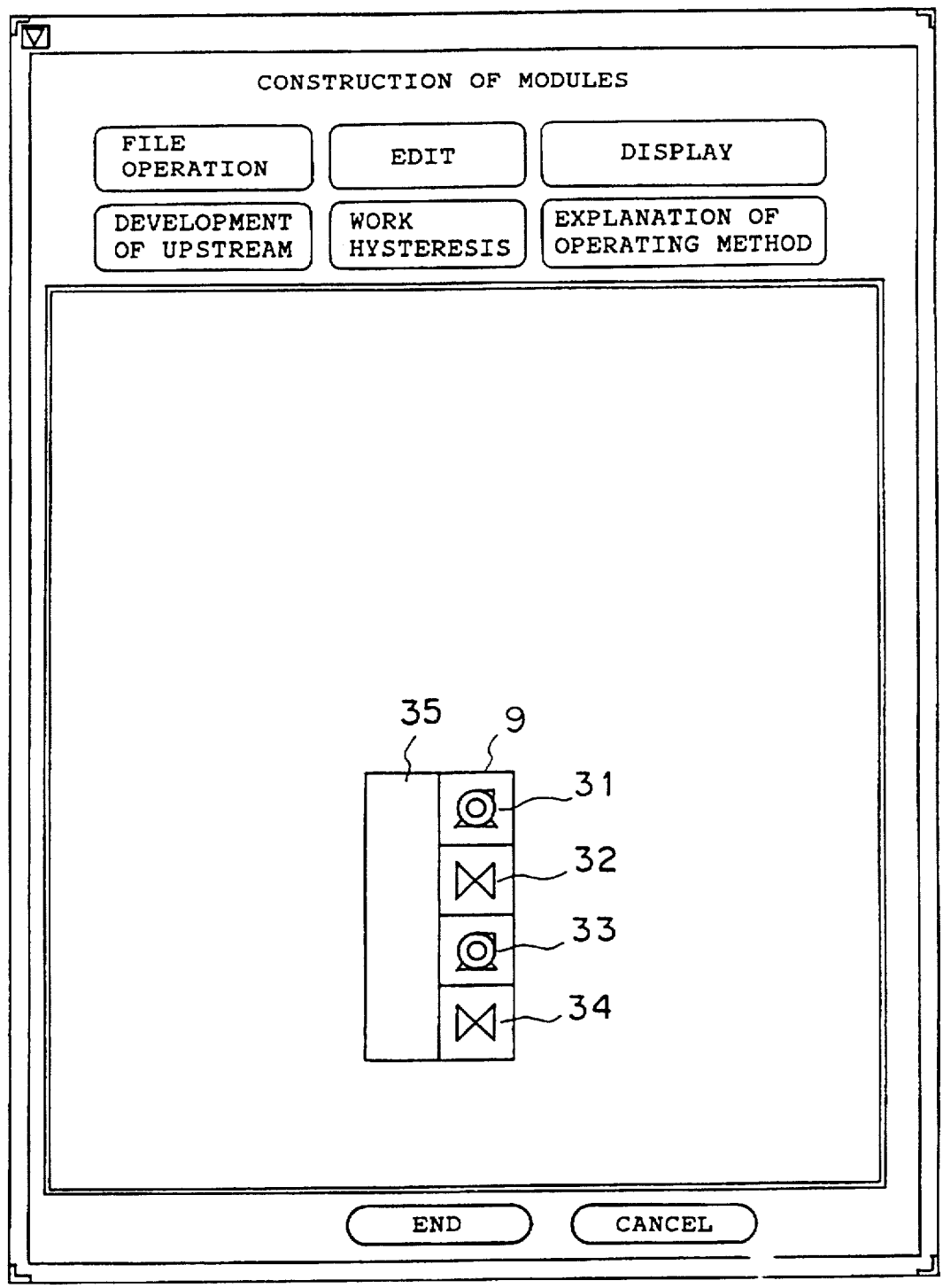
FIG. 7 is a diagram showing a picture of a module construction of a selected subject to be controlled.

When the controlled subjects 9 are selected, the controlled subjects 9 (for example, the two pumps 31 and 33 and the two valves 32 and 34) are displayed on the display unit 9 as shown in FIG. 7. In FIG. 7, a sequence of a pump 31, a valve 32, a pump 33, and a valve 34 is displayed from the top. This sequence coincides with the sequence of selection of the controlled subjects selected on the picture of the menu. Reference numeral 35 in FIG. 7 displayed on the left side of the controlled subjects 9 represents a program parts module prepared in the default with respect to the controlled subject 9. In FIG. 7, as an initial state before setting the connection relationship, the pump 31, the valve 32, the pump 33, and the valve 34 are formed under one module.

When the selection of the controlled subjects 9 is thus finished, the designing support apparatus prompts to select the next work item (step ST5). Here, it is assumed that the program designer selects to set the above-mentioned connecting relationship, namely, selects the operations of the modules (step ST7).

The set of the connecting relationship of the selected controlled subjects 9 can be carried out by handling a command "EDIT" in the picture in FIG. 7.

That is, although it is not shown in the figure, when the "EDIT" command is selected, the program parts module 35 prepared in the default by the system can be arbitrarily divided into groups so that the construction of modules is set by using the divided groups. In an example shown in FIG. 8, the program parts module 35 which was prepared in the default by the system is reconstructed to be three-hierarchically combined program parts modules 35a to 35c which are prepared in the default. In this case, the program parts module 35b prepared in the default deals with the pump 31 and the valve 32 as one controlled subject (module), the program parts module 35c prepared in the default deals with the pump 33 and the valve 34 as one controlled subject (module), and the program parts module 35a prepared in the default deals with the program parts modules 35b and 35c as one controlled subject, respectively. Accordingly, in this example, the module construction consists of three hierarchies. The module in each hierarchy represents the contents of the control. On the other hand, for a higher order module, a lower order module can be deemed as a controlled subject.

Thus, the operations of the modules are finished. FIG. 6 is a flow chart practically explaining the operations of the modules. The contents shown in FIG. 6 will be described briefly.

That is, after designating a module which is a subject to be operated (step ST22), the operating contents are designated (step ST23). There are following operating contents (steps ST25 to ST31):

DELETE ... an operation to delete a designated module from the program parts that are hierarchically connected;

CONNECTION ... an operation to connect an inner interface of an arbitral module with an outer interface of an arbitral module;

CUT ... an operation to cut between modules that are connected by the inner module and the outer module;

COPY ... an operation to temporally copy a designated module to a predetermined area;

PASTE ... an operation to copy the module stored in the above-mentioned predetermined area into a work area;

GROUPING ... an operation to express a plurality of modules in the same hierarchy by a common module in a higher-order of the plurality of modules (for example, an operation to prepare the default 35a which is in a higher order than the default 35b and the default 35c); and CANCEL ... an operation to delete the designated module and connect a module in its lower order to an upper order module.

Figure 9:
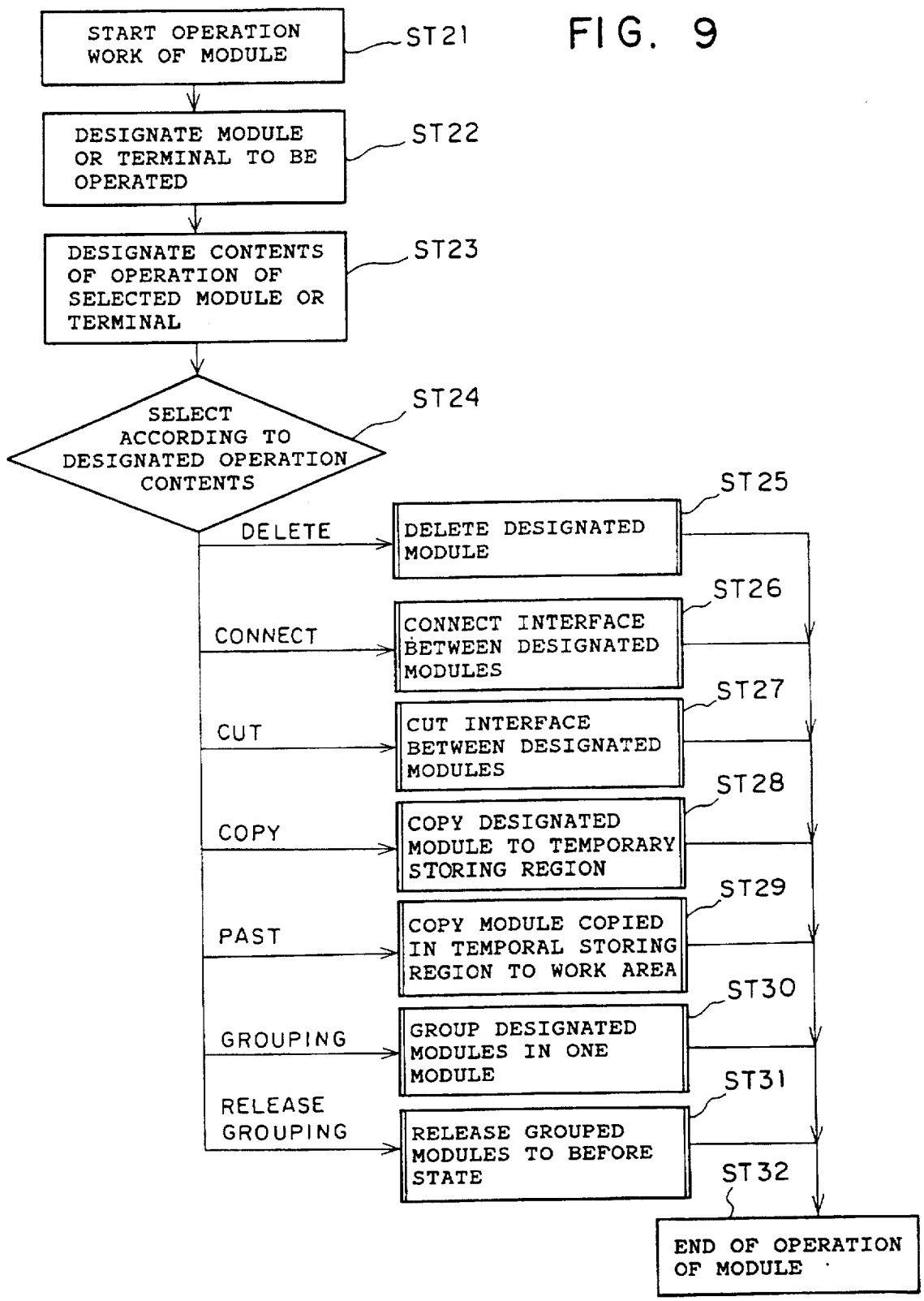
FIG. 9 is a flow chart explaining the operation work of a module.

When an operation of a module to be operated is finished in accordance with the process shown in FIG. 9, the program designing support apparatus prompts to select the next work item (step ST5). Here, it is assumed that, in order to specify the contents of the control of the module in each layer, the program designer selects a work item to search program parts (step ST8).

Figure 11:
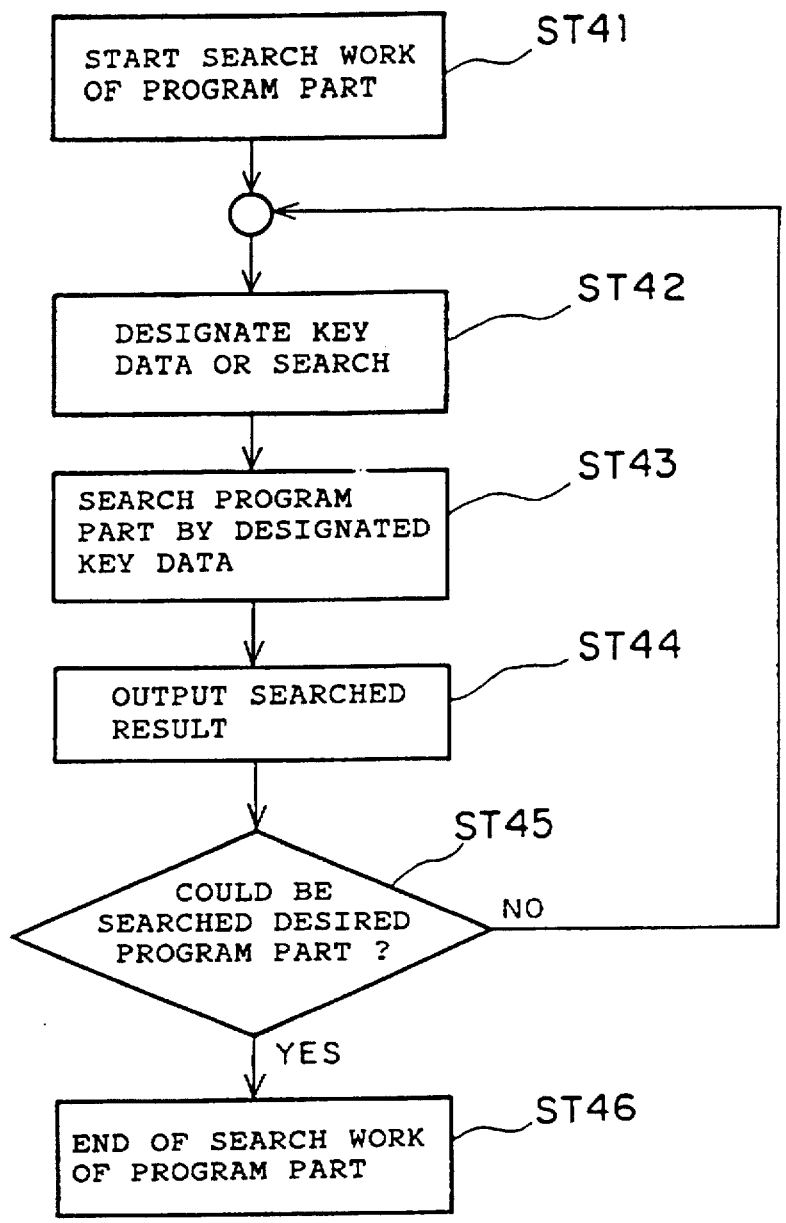
FIG. 11 is a flow chart explaining a searching work of a program part.

In this connection, FIG. 11 is a flow chart showing the operation to search the program parts.

Figure 8:
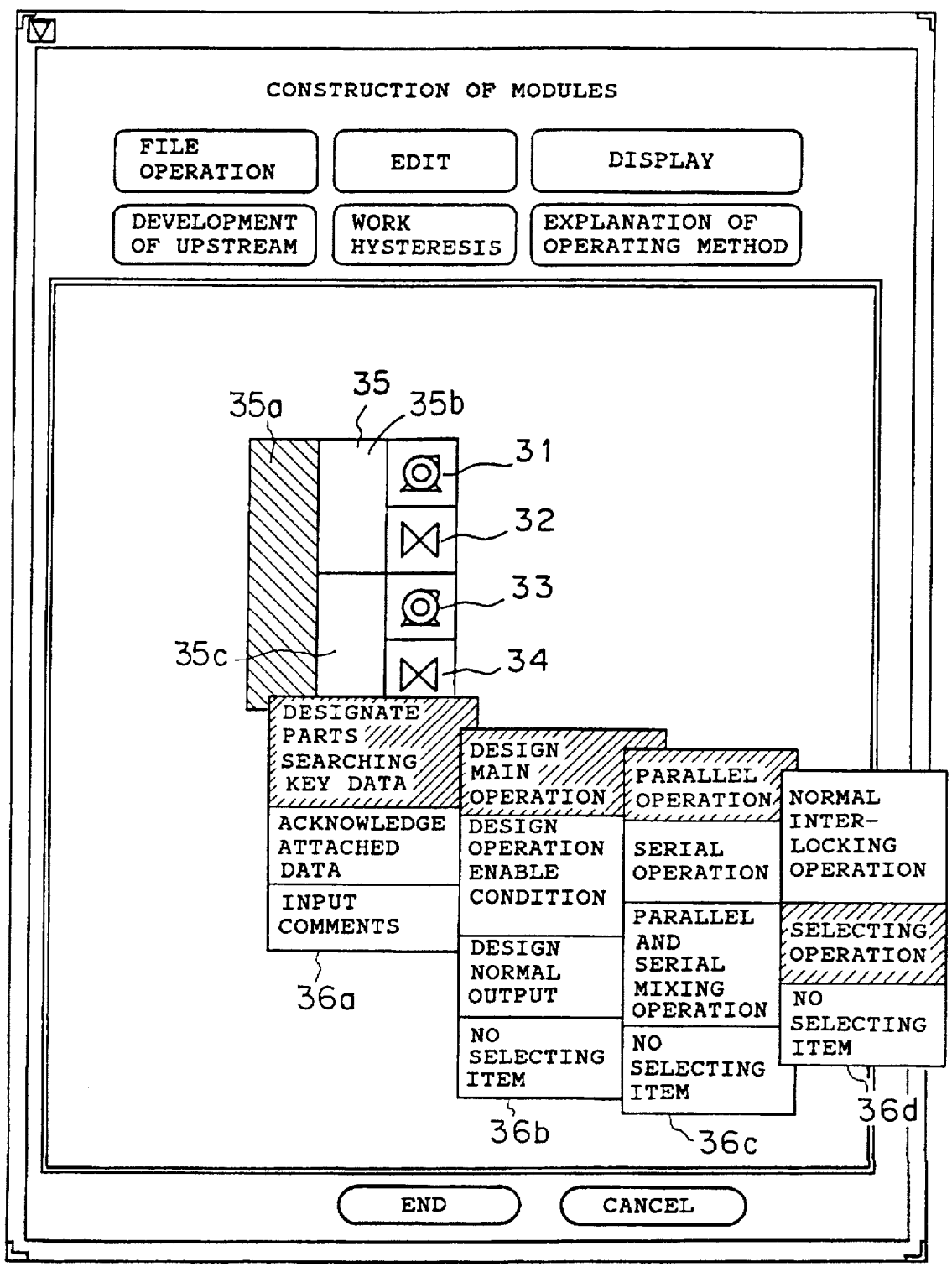
FIG. 8 is a diagram showing a picture of a menu for setting attributes of each subject to be controlled.

First, since the construction of the modules in this example is as shown in FIG. 8, the modules 35a to 35c for specifying the control contents are sequentially selected to search the program parts for the respective module. For example, when the program parts in the module 35a are to be searched, it is necessary to click the module 35a to sequentially display the attribute setting windows 36a to 36d for specifying the contents of the control so that the attributes are sequentially selected to specify the contents of the control. It should be noted that, among the attribute setting windows 36a to 36d, the attribute setting window 36a is the uppermost attribute. After finishing the set of the attribute of the uppermost attribute setting window, the next low order attribute setting window is sequentially displayed.

Thus, the contents of the control are specified by selecting the attributes. The selected attributes are searching data for selecting the program parts (step ST42).

In this example, as shown in FIG. 8 by slash lines, "designating parts searching key data", "designing main operation", "parallel operation", and "selecting operation" are selected. Therefore, the contents of the control are such that, assuming that the pump 31 and the valve 32 are deemed as one controlled subject and that the pump 32 and the valve 34 are deemed as another controlled subject, then the two controlled subjects are connected in parallel, and one of the controlled subjects is selectively used as a standby machine (see a logic circuit 44 in FIG. 10). In the logic circuit 44 in FIG. 10, reference symbol 44a represents command signals, 44b is signals indicating under operation, 44c is signals indicating under not stopping, 55d is operation enable signals, and 44e is standby machine selecting switches.

Then, the program parts managing unit 14 searches, on the basis of the above-mentioned searching data, the program parts in the module 35a from the program parts stored in the storage unit 13 (step ST43).

The contents of the control for the module 35b or 35c prepared in the default are also specified by clicking the module 35b or 35c in the similar way as in the case of the module 35a prepared in the default to display the attribute setting windows (not shown) so as to sequentially select the attributes.

Figure 10:
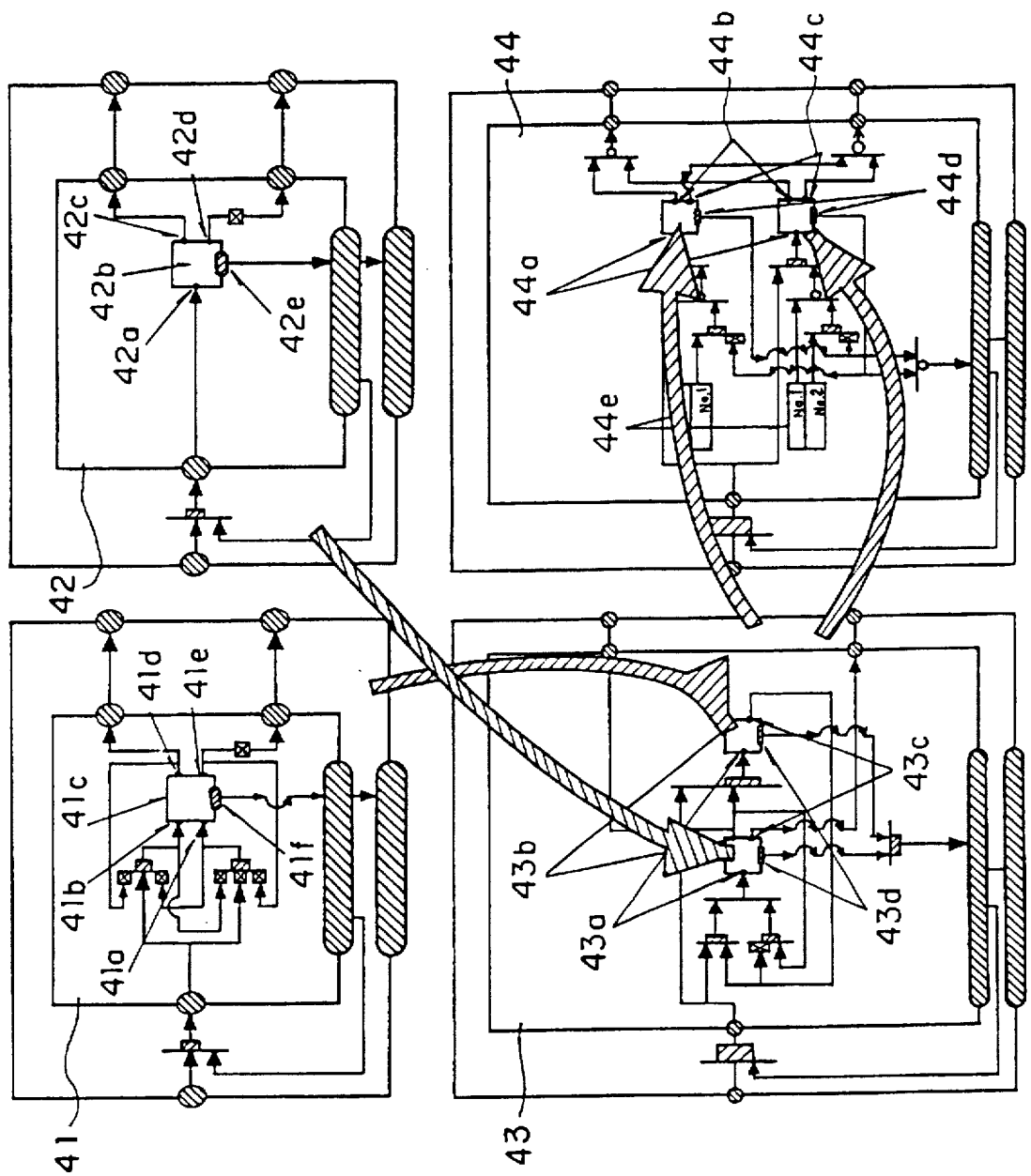
FIG. 10 is a logic circuit diagram showing logic circuits of respective modules.

In this example, it is assumed that the valve 32 is arranged at the output side of the pump 31; at a starting operation, the valve 32 is opened after operating the pump 31; and at a stop operation, the pump 31 is stopped after closing the valve 32 (see a logic circuit 43 in FIG. 10). In the logic circuit 43 in FIG. 10, reference symbols 43a represents command signals, 43b is signals indicating under operation, 43c is signals indicating under not stopping, and 43d is operation enable signals. The contents of the control for the pump 33 and the valve 34 are similar as above.

Then, the program parts managing unit 14 searches, on the basis of the above-mentioned searching data, the program parts for the module 35b or 35c from the program parts stored in the storage unit 13.

For example, with respect to a pump, the contents of the control peculiar for the pump are described as a logic circuit of a level in which the contents of the control of the pump do not include the opening or closing condition of a valve and the control of the pump does not influence on the control of the valve (see a logic circuit 42 in FIG. 10). In the logic circuit 42 in FIG. 10, 42a represents a command signal, 42b is an initially sunk dirty mud pump, 42c is a signal indicating under operation, 42d is a signal indicating under stopping, and 42e is an operation enable signal. The contents of the control peculiar for the pumps 31 and 33 and the valves 32 and 34 respectively are also stored as program parts in the storage unit 13. Therefore, the program parts for realizing a process under the contents of the control peculiar to the controlled subject are searched on the basis of the name of each controlled subject. In this example, it is assumed that the contents of the control for the pumps 31 and 33 are the same, and the contents of the control for the valves 32 and 34 are the same.

After the search of the program parts is finished, the program data managing unit 15 hierarchically combines the searched program parts on the basis of the constriction of modules shown in FIG. 8 to complete a control program or a new program part.

Practically, a control program or a new program part is completed in such a way that the logic circuit 43 is inserted into the portions indicated by arrows in the logic circuit 44 shown in FIG. 10; and further, the logic circuit 41 and the logic circuit 42 are inserted into the portions indicated by arrows in the logic circuit 43.

Figure 12:
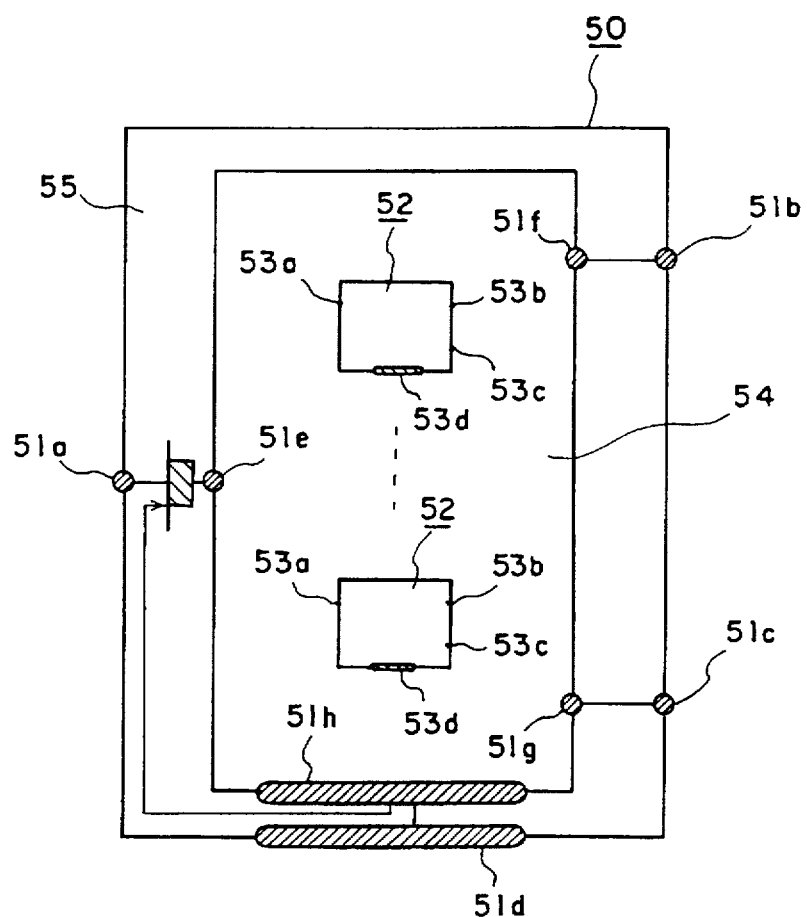
FIG. 12 is a construction diagram showing a basic construction of a module.

Each of the logic circuits (modules) shown in FIG. 10 has a construction as shown in FIG. 12. Namely, in FIG. 12, reference symbols 51a to 51d are interfaces with the outside of a module 50; 51e to 51h are interfaces with the insides of the module 50; 52 is a module of the controlled subject which is one-rank lower than the module 50. For example, when the module 50 shown in FIG. 12 is the logic circuit 44 shown in FIG. 10, the module 52 is the logic circuit 43 shown in FIG. 10. Reference symbols 53a to 53d are interfaces with the outside of the module 52, and 54 is an area in which the contents of the control of the module 50 are described. By the control contents, the inside interfaces 51e to 51h are connected to the outside interfaces 53a to 53d, resulting in that the module 50 and the module 52 are hierarchically connected. Here, a command signal is supplied through the interface 53a to the module 52; signals indicating the state of the relation between the module 52 and the outer interface 53a are supplied through the outer interfaces 53b and 53c; and a signal indicating an operation enable state of the module 52 is supplied through the outer interface 53d. The number of terminals in each of the modules may be different from the illustrated example. Similar relation as that between the module 52 and the outer interfaces 53a to 53d is defined between the module 50 and the outer interfaces 51a to 51d. Reference numeral 55 represents an area in which logic circuits commonly designated in the control contents among the hierarchy are written. In the construction, the internal interface 51h representing the state of the operation enable state with respect to the internal control contents and the outer interface 51a through which a command signal to the module 50 is supplied are interlocked.

When the coupling of the program parts is finished in this way, the designing support apparatus prompts to select the next work item (step ST5). It is assumed here that the program designer selects the evaluation of the timing so as to evaluate, on the basis of the hierarchically coupled program parts, the operating time of the controlled subject constructing the contents of the control realized by the program parts (step ST13).

Figure 13:
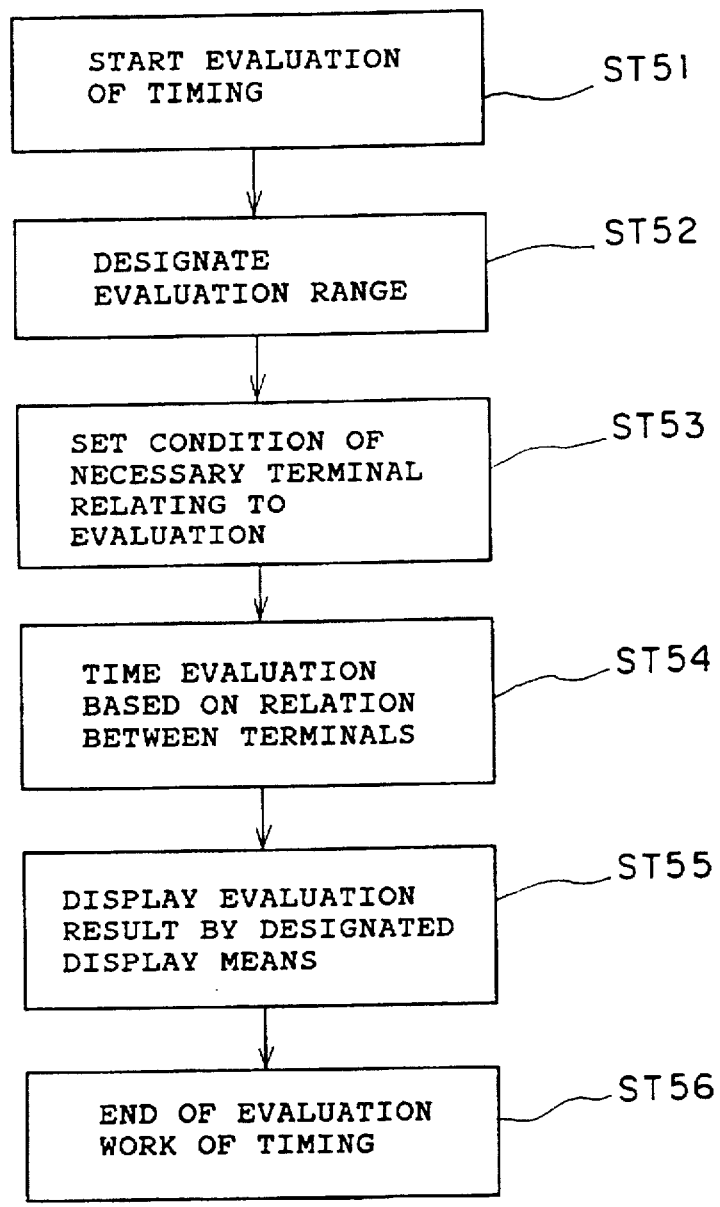
FIG. 13 is a flow chart explaining the operation of a timing evaluation.

In this connection, FIG. 13 is a flow chart showing the operation of the timing evaluation.

First, to evaluate the timing, the range of the program to be evaluate, that is, the program parts on which the timing evaluation is to be conducted, is set (step ST52). Then, evaluating conditions necessary for the timing evaluation (for example, the conditions of the start time and the stop time of the program parts which are the subject to be evaluated) are inputted from the plural time axes coordinate plane input unit 22 or from the time-chart input unit 19 (step ST53).

Next, the timing evaluating unit 20 actually carries out the timing evaluation (step ST54). In the timing evaluation, the operating time of the operated result of each logic operator and the operating time of the controlled subject are evaluated, on the basis of the program parts to be evaluated, and by recognizing the logic of the contents of the control (such as the logic shown in FIG. 10) to be realized by the program parts, recognizing the connecting relationship between the logic operators constructing the logic and the controlled subject, and on the basis of the logical connecting relationship.

Figure 1:
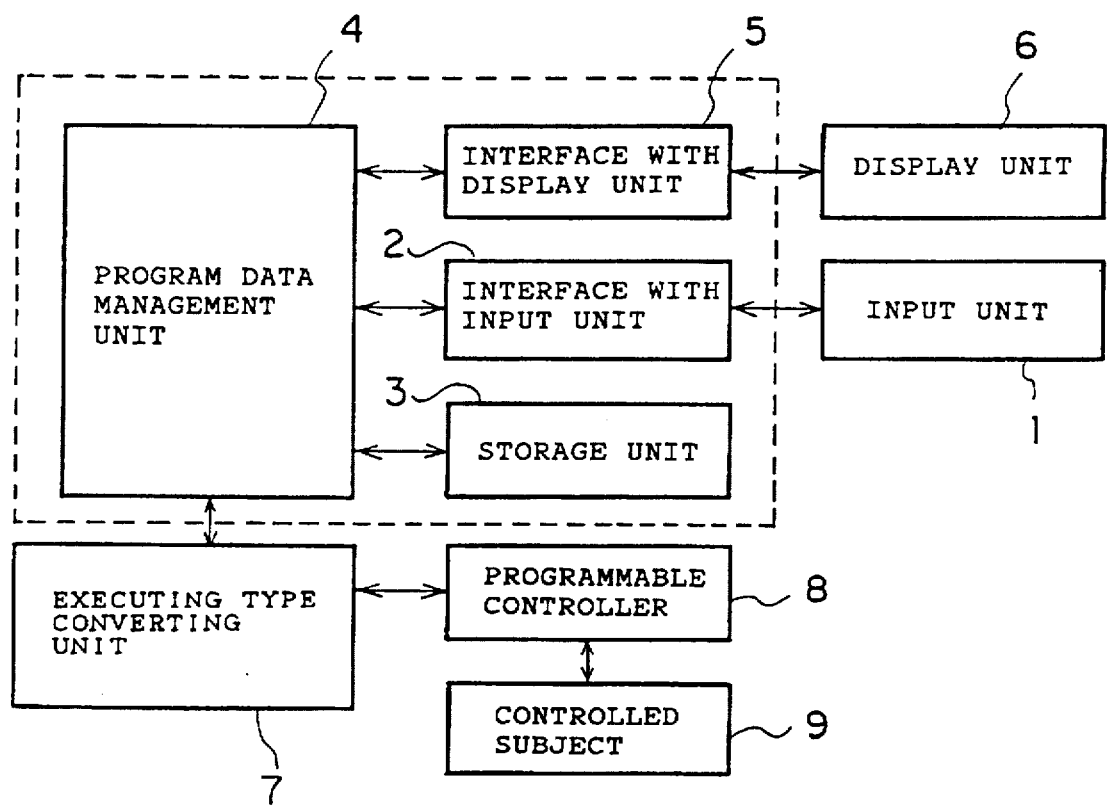
FIG. 1 is a construction diagram showing a conventional control program signing support apparatus.
Figure 2:
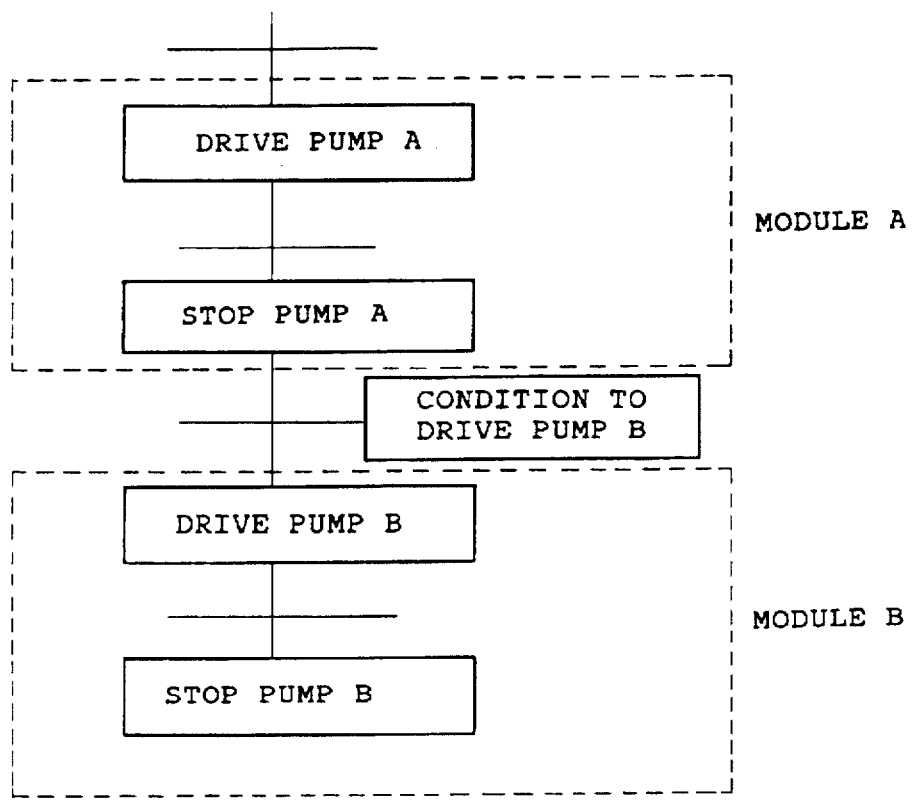
FIG. 2 is a construction diagram showing a conventional module construction of a control program.
Figure 3:
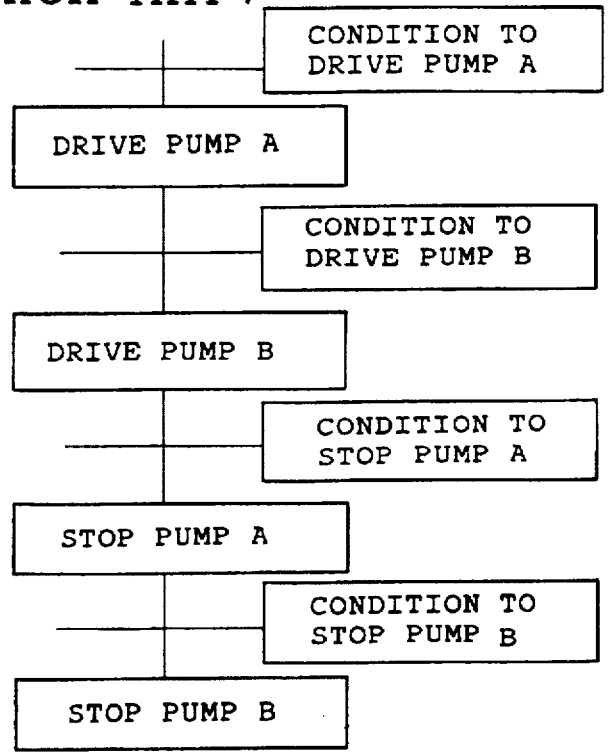
FIG. 3 is a construction diagram showing another conventional module construction of a control program.
Figure 14:
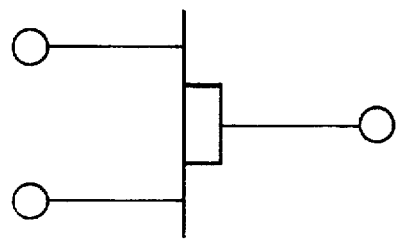
FIG. 14 is a logic circuit diagram showing an AND operator.
Figure 15:
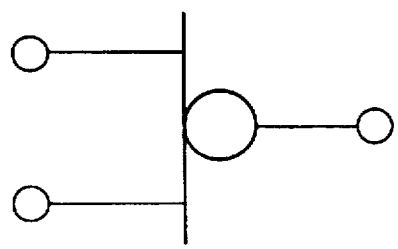
FIG. 15 is a logic circuit diagram showing an OR operator.
Figure 29:
FIG. 29 is a logic circuit diagram showing a NOT operator.

Namely, as shown in FIG. 10, since the contents of the control of the program parts consist of combinations of AND operators (see FIG. 14), OR operators (see FIG. 1), and NOT operators (see FIG. 29), the timing evaluating unit 20 recognizes the signal state of the terminal of each logic operator or the controlled subject in the module, on the basis of the logic of each logic operator or a delay time with respect to a signal command of a signal at the output terminal which is set for the controlled subject in the module, so as to evaluate the operating time of each logic operator and of the controlled subject in the module. It should be noted that the NOT operator or the XOR operator can be expressed by the AND operators and the OR operators.

On the other hand, since the timing evaluating unit 20 displays the signal state of the terminal of each logic operator on the plural time axes coordinate plane of the plural time axes coordinate plane display unit 23 or the time chart display unit 21 (step ST55), the program designer can evaluate the output of each logic operator and the operating time of the controlled subject.

Here, the plural time axes coordinate plane is a plane with an axis of ordinate representing operation start times and an axis of abscissa representing operation stop times. The plural time axes coordinate plane has a characteristic of being able to express each event by one point which occurs continuously in time, and which can express time relationships among a plurality of events by using the position relationships among the respective points.

Figure 16:
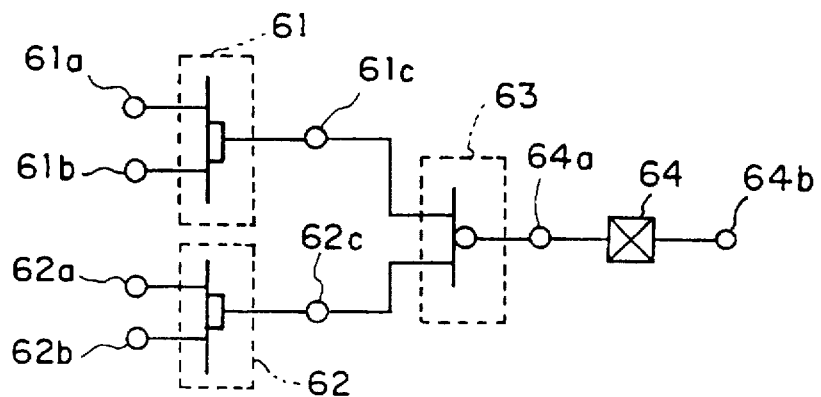
FIG. 16 is a logic circuit diagram showing the contents of a control.
Figure 17:
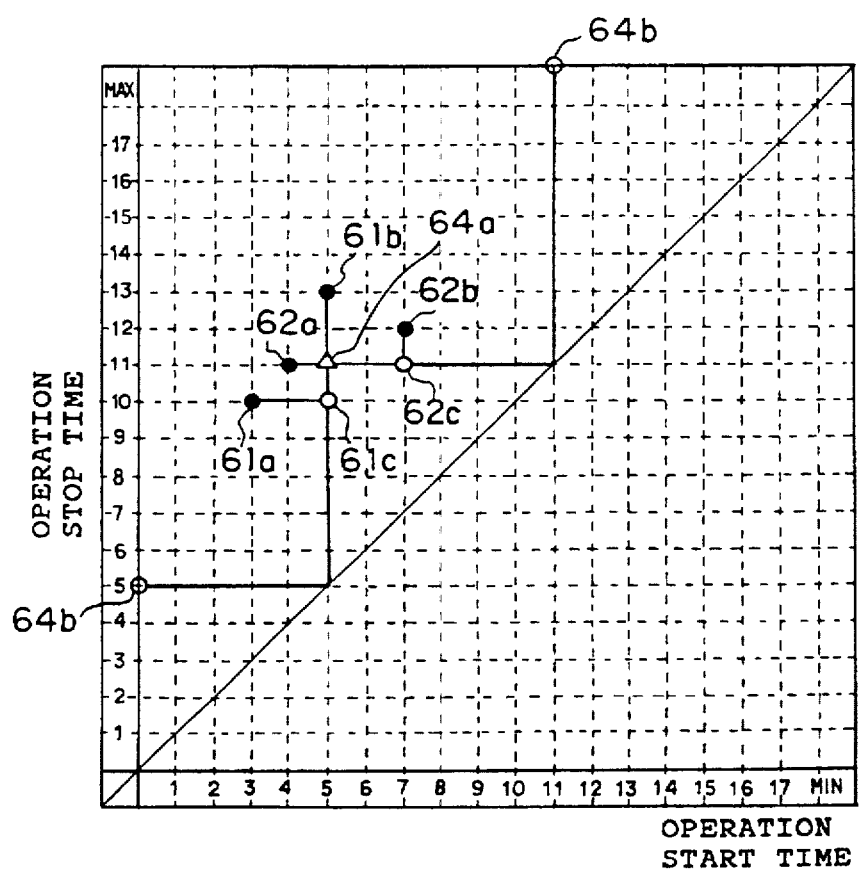
FIG. 17 is a diagram of a plural axes coordinate plane showing the contents of a control.

For example, as shown in FIG. 16, when the contents of the control are constructed by two AND operators 61 and 62 and an OR operator 63, and when the signal states of the input terminals 61a and 61b of the AND operator 61, and the input terminals 62a and 62b of the AND operators 6 are determined as follows:

input terminal 61a is ON during a period between a time 3 minute (hereinafter the unit of the time is minute) to a time 10;

input terminal 61b is On during a period between a time 5 to a time 13;

input terminal 62a is ON during a period between a time 4 to a time 11; and input terminal 62b is On during a period between a time 7 to a time 12;

then, the signal states of the terminals of the AND operators 61 and 62 and the OR operator 63 are expressed as shown in FIG. 17 so that the operating times of the AND operators 61 and 62 and the OR operator 63 can be evaluated.

That is, with respect to the AND operator 61, as a matter of course, when both of the input terminals 61a and 61b are in the ON states, the output terminal 61c is in the ON state so that the timing evaluating unit 20 can recognize, on the basis of the signal states of the input terminals 61a and 61b, that the output terminal 61c is in the ON state during a period from the time 5 to the time 10. With respect to the AND operator 62, similar discussion as above can be applied.

With respect to the OR operator, at least one of the input terminals 61c and 62c is in the ON state, the output terminal 64a is in the ON state so that the timing evaluating unit 20 can recognize, on the basis of the signal states of the input terminals 61c and 62c, that the output terminal 64a is in the ON state during a period from the time 5 to the time 11. With respect to the NOT operator, when the terminal 64a is in the ON state, the output terminal 64b is in the OFF state. Therefore, the timing evaluating unit 20 can recognize, on the basis of the signal state of the terminal 64a, that the output terminal 64b is in the ON state in the period from the infinitely far past to the time 5 and from the time 11 to the infinitely far future.

Note that the operating time periods of the AND operator 61, the AND operator 62, the OR operator 63, and the NOT operator 64 can be evaluated by observing the signal states of the output terminal 61c, the output terminal 62c, the terminal 64a, and the output terminal 64b, respectively.

Thus, when the signal state of the input terminal of the logic operator arranged in the upper-most stream, that is, when the start time or the like of the program part to be evaluated is determined, the operating period of each logic operator can be evaluated. In addition, the controlled subject can be treated as a construction element for providing an output signal having a constant delay time with respect to the input signal (for example, such as the outputs 72c and 72b with respect to 72a in FIG. 24).

Figure 18:
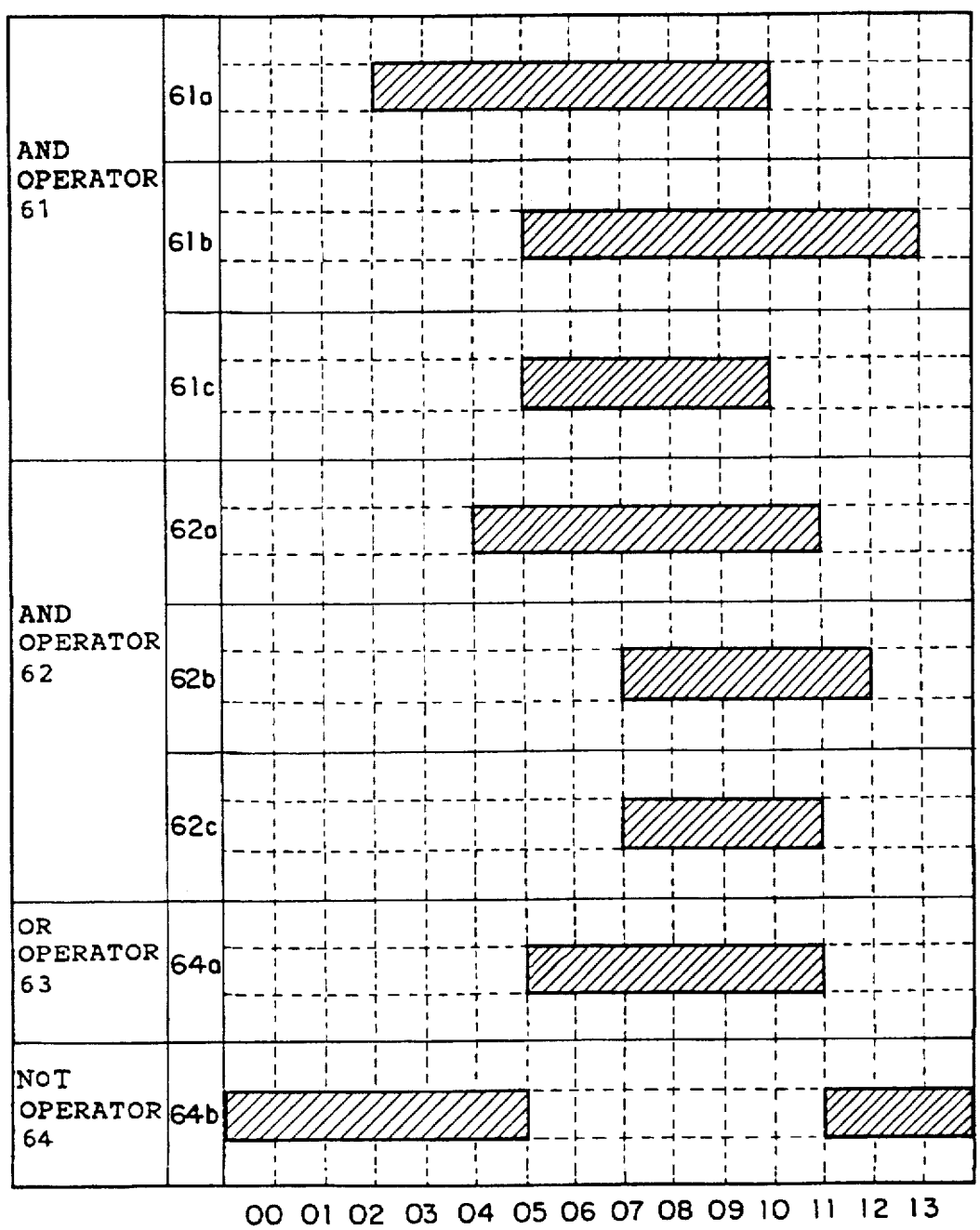
FIG. 18 is a time chart showing the contents of the control shown in FIG. 16.

In this connection, the contents displayed on the plural time axes coordinate plane, that is, the signal state of each logic operator, can be expressed by a time chart shown in FIG. 18. The time chart is displayed on the time chart display unit 21. Thus, the program designer can also evaluate the operating period of the operated result of each logical operator by means of the time chart display unit 21.

When the timing evaluation is thus finished, the designing support apparatus prompts to select the next work item (step ST5). It is assumed here that, in order to display the change of the operating condition of each controlled subject 9 along with the lapse of time, the program designer selects the output of the operation sequence (step ST16).

Figure 19:
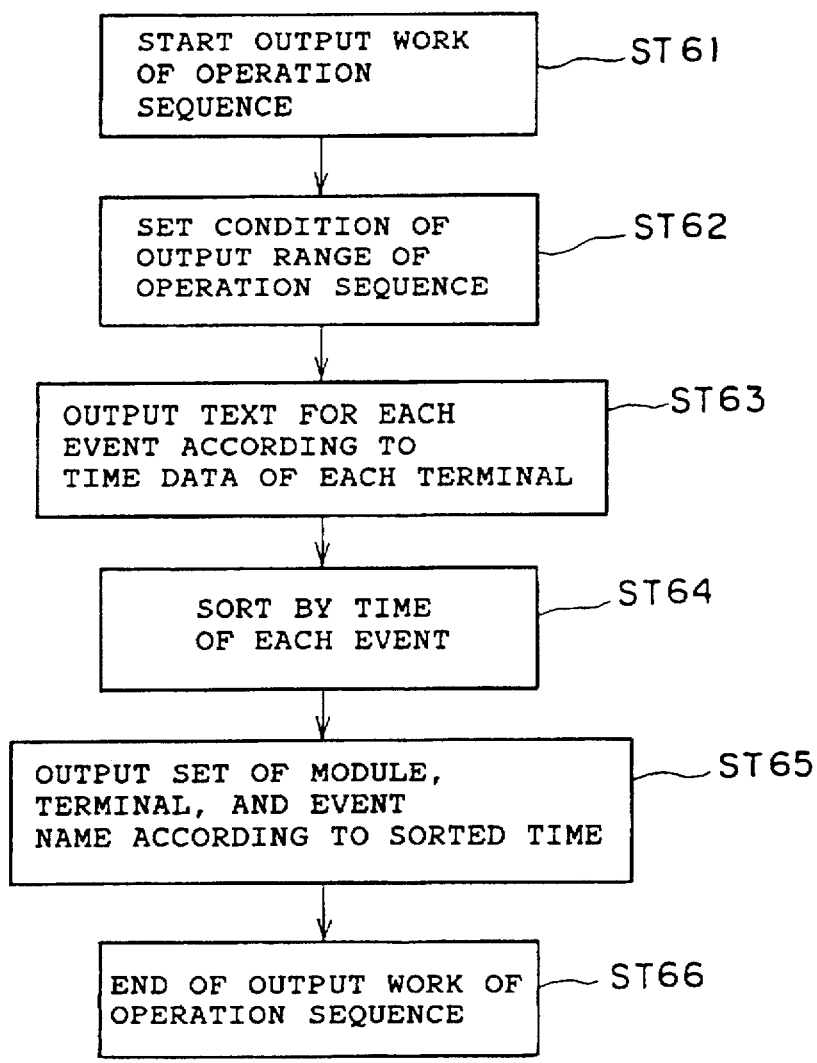
FIG. 19 is a flow chart explaining an output work of an operation sequence.

In this connection, FIG. 19 is a flow chart showing the operation of the output of the operation sequence.

In FIG. 19, first, the controlled subject or the like for outputting the operation sequence is set by means of the command entering unit 11 or the data entering unit 12 (step ST62). Thereby, the operating condition recognizing unit 25 recognizes, on the basis of the result evaluated by the timing evaluating unit 20, the operation start time and the operation stop time of each designated controlled subject (step ST63).

Then, the operating condition recognizing unit 25 sorts the operation start times and the operation stop times of the respective designated controlled subjects 9 in accordance with the times when the respective events occur, to determine the operation sequence of the respective events (step ST64).

Then, the operating state recognizing unit 25 outputs the contents of the events (the names of the controlled subjects by which the events are generated, the operating condition of the controlled subjects such as the operation starts or the operation stops, and the like), that are to be occurred in accordance with the sorted times, to the operating condition display unit 26 (step ST65).

When the output of the operation sequence is thus finished, the designing support apparatus prompts again to select the next work item (step ST5). Here, it is assumed that the program designer selects to edit the program parts (step ST10).

Figure 20:
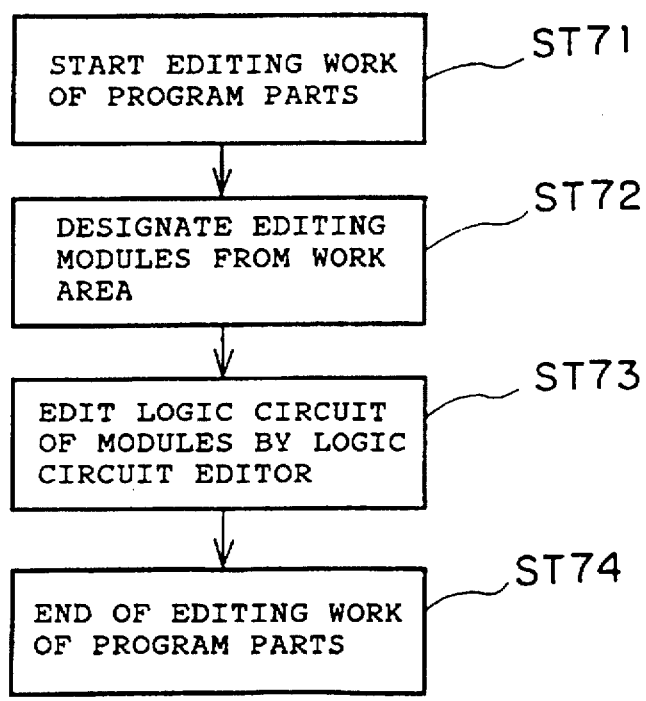
FIG. 20 is a flow chart explaining an editing work of program parts.

In this connection, FIG. 20 is a flowchart showing the operation of the edition of the program parts.

In FIG. 20, first, when a module for editing the program parts is selected by the editing unit 18 (step ST72), the editing unit 17 recognizes a logic circuit diagram described in the program parts of the selected module, and displays the logic circuit diagram by starting an editor.

Thereby, the program designer edits the logic circuit by using the editor (step ST73).

When the edition of the program parts is thus finished, the designing support apparatus again prompts to select the next work item (step ST5). Here, it is assumed that the program designer selects to generate basic operation program parts (step ST17).

Figure 21:
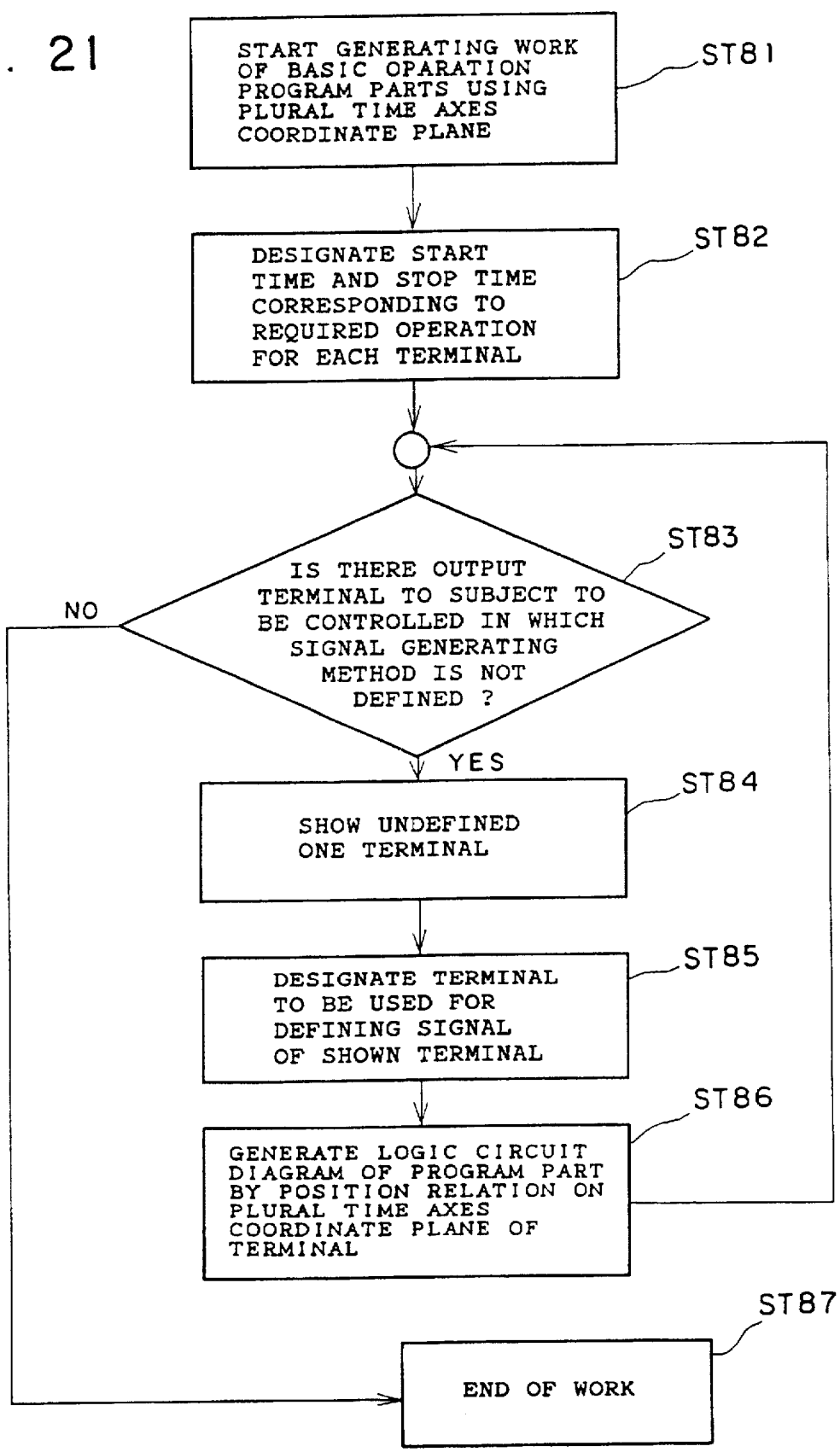
FIG. 21 is a flow chart explaining preparing work of a basic operation program part.

In this connection, FIG. 21 is a flowchart showing the operation of the generation of the basic operation program parts.

Figure 22:
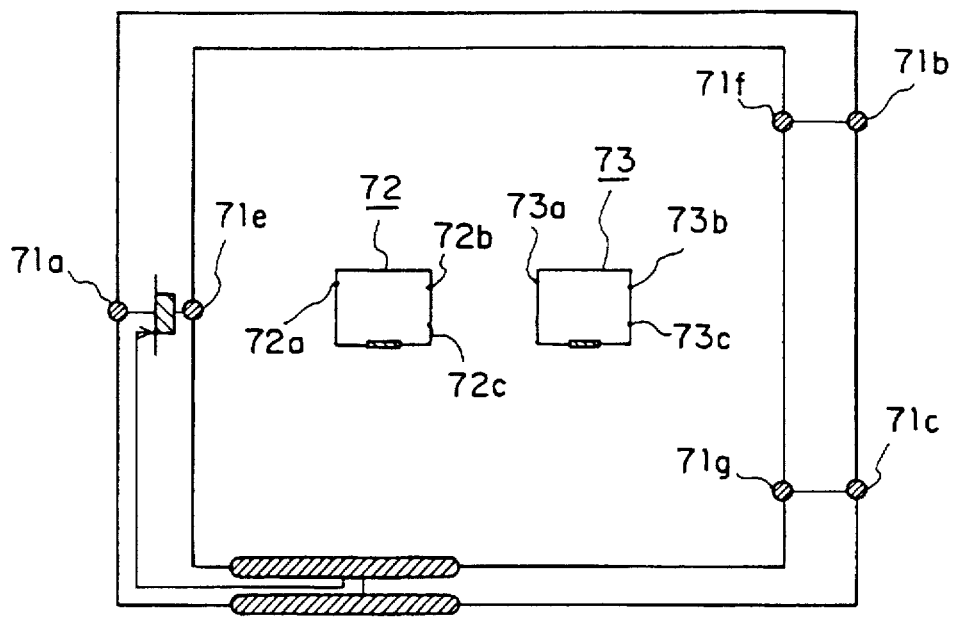
FIG. 22 is a construction diagram showing the construction of subject to be controlled for which the basic operation program is to be prepared.
Figure 23:
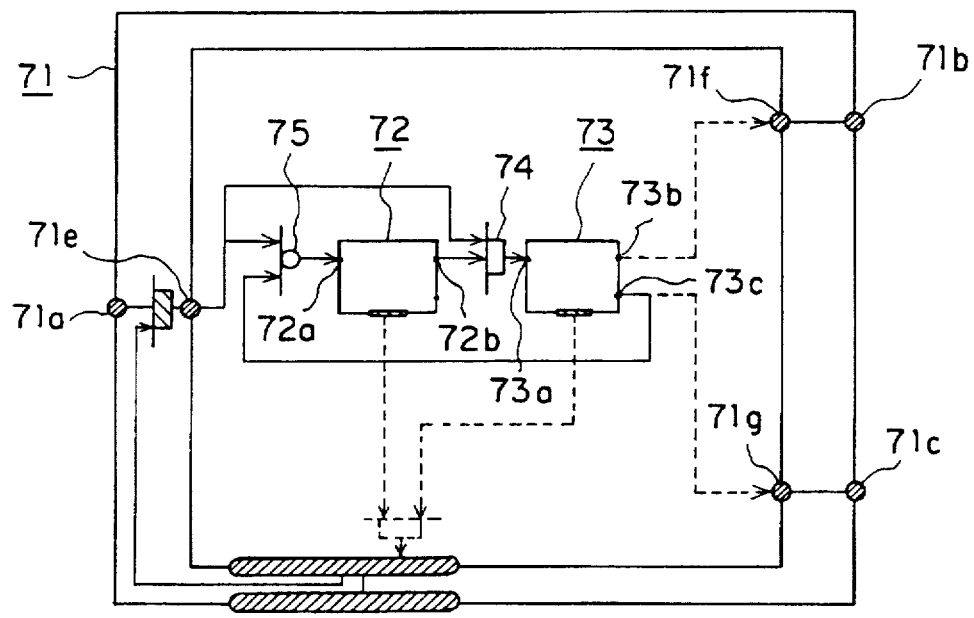
FIG. 23 is a logic circuit diagram showing a logic circuit of a basic operation program part to be prepared.

In FIG. 21, first, the operation start time and the operation stop time of the controlled subject are inputted, as a point on the plural time axes coordinate plane, from the plural time axes coordinate plane input unit 22 (step ST82). For example, an explanation will be given for the case in which, as shown in FIG. 22, a module 71 including two modules 72 and 73 as the controlled subject is to be generated as the basic operation program part. In FIG. 23, the logic circuit of the basic operation program part to be generated is shown.

Figure 24:
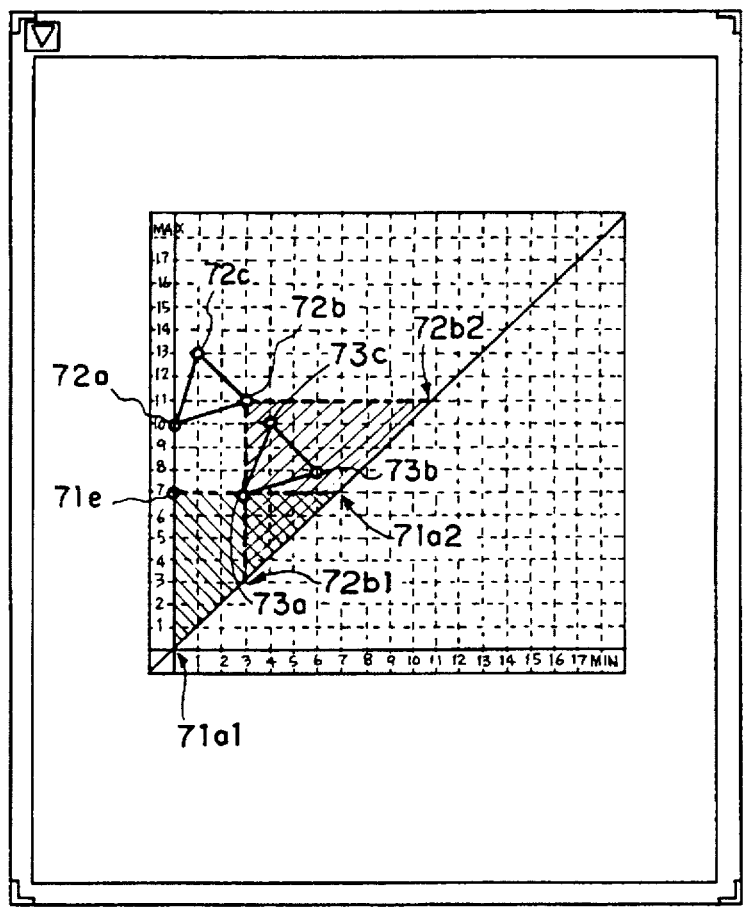
FIG. 24 is a diagram of a plural axes coordinate plane showing the contents of the control shown in FIG. 23.

The signals from the interfaces 72a, 72c, 73a to 73c, and 71e of the two controlled subjects 72 and 73 are expressed as points on the plural time axis coordinate plane as shown in FIG. 24.

From the position relationship of the points on the plural time axis coordinate plane, a connecting relationship of the logic circuit shown in FIG. 23 can be obtained. In case shown in FIG. 23, an internal interface 71e of the module 71 is connected to one of the inputs of an AND operator 74; and an outer interface 72b of the module 72 is connected to the other one of the input terminals of the AND operator 74.

On the other hand, the internal interface 71e of the module 71 is connected to one of the input terminals of an OR operator 75; and the outer interface 71e of the module 73 is connected to the other one of the input terminals of the OR operator 75.

The reason thereof is as follows.

Namely, when the signal states of the internal interface 71e of the module 71, the outer interface 72e of the module 72, the outer interface 73a of the module 73, the outer interface 73c of the module 73, and the outer interface 72e of the module 72 are set as shown in FIG. 24, then, it will be seen from FIG. 24 that the signal state of the interface 73a is an AND of the signal states of the interfaces 72b and 71e, because the point 73a is a vertex of a right angled triangle having vertexes 73a, 72b1, and 71a2, which is an overlapped right angled triangle region of a right angled triangle having vertexes 72b, 72b1, and 72b2, and a right angled triangle having vertexes 71e, 71a1, and 71a2. This logical relationship can also be understood from the logical diagram shown in FIG. 17. It should be noted that, in FIG. 24, in a triangle, a side of a triangle including the point 72b, for example, and parallel to the axis of ordinate represents a set of events which start to operate at the same time as the event 72b; a side including the point 72b, for example, and parallel to the axis of abscissa represents a set of events of the stopping time same as that of the point 72b; and a side passing through the original point and having an inclined angle of 45° with respect to the axis of abscissa represents a set of events in which the start time and the stop time are the same. This is similar for the other points 71e and 73c.

Similarly, it will be seen from FIG. 24 that the signal state of the interface 72a is an OR of the signal state of the interfaces 71e and 73c, because the point 72a is a vertex of a right angled triangle having a vertical side with a length equal to the OR of the vertical side of the right angled triangle including the point 71e and the vertical side of the right angled triangle including the point 73c, and having a horizontal side with a length equal to the OR of the right angled triangle including the point 71e and the horizontal side of the right angled triangle including the point 73c. This also can be understood from the logical diagram shown in FIG. 17.

Thus, by comparing the position relationship of respective points on the plural time axis coordinate plane with the specific position relationship of the input and output terminals of respective operators on the plural time axis coordinate plane shown in FIG. 17, the operators for realizing the desired operations can be appropriately selected.

Figure 25:
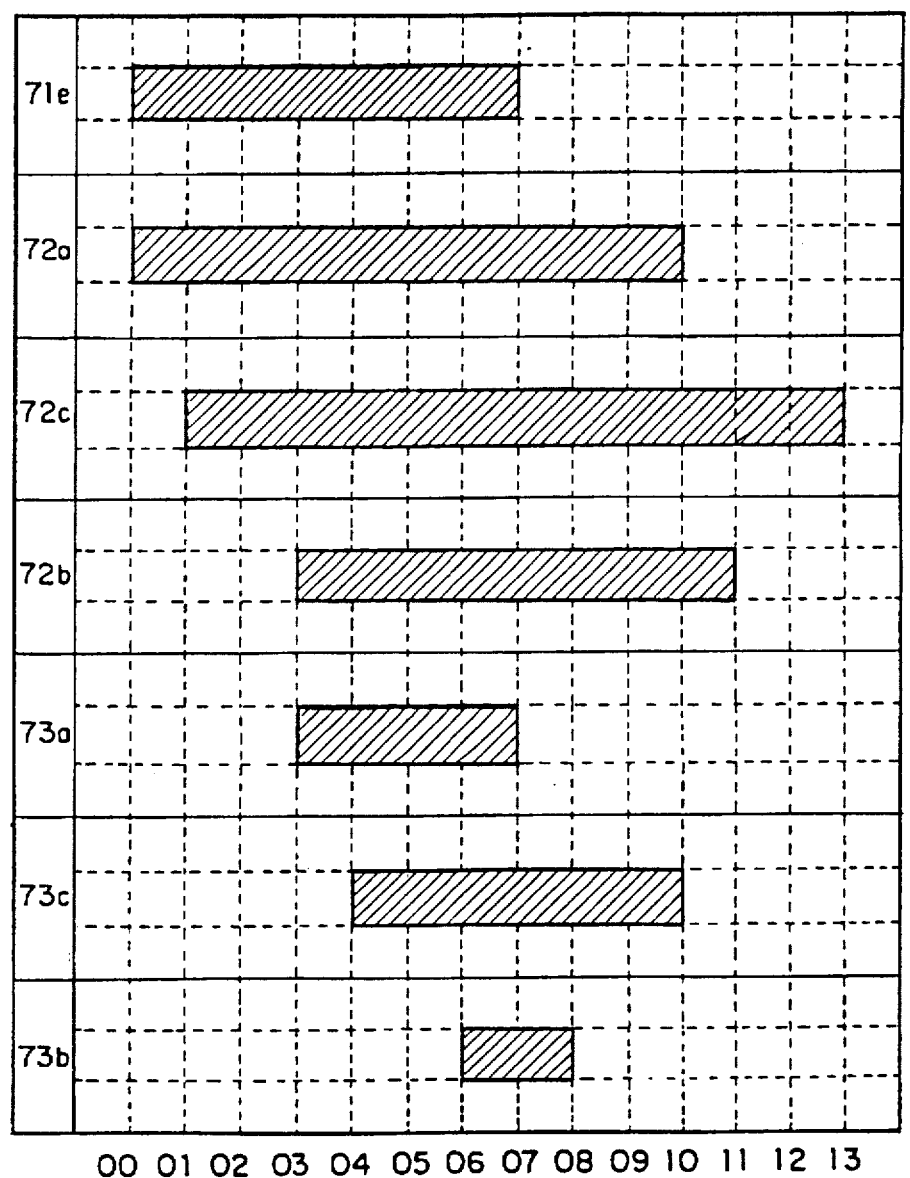
FIG. 25 is a time chart showing the contents of the control shown in 23.

Note that FIG. 25 is a diagram expressing the state show in FIG. 24 as a time chart.

Accordingly, by setting the interfaces of the respective modules as shown in FIG. 24, a logic circuit as shown in FIG. 23 can be obtained (steps ST83 to 86).

Once the logic circuit is thus obtained, the program parts preparing unit 24 prepares, based on the logic of the logic circuit, the program parts for realizing the logic.

Note that, in the description with reference to FIG. 24, there is no mention about the outer interface 72c of the module 72 and the outer interface 73b of the module 73. This is because the outer interfaces 72c and 73b do not relate to the connection relationship between the module 72 and the module 73. In this connection, since the outer interface 72c and so forth are the outputs of the module 72 and so forth, it is sufficient to set them to be started after the outer interface 72a and so forth.

When the preparation of the basic operation program parts is thus finished, the designing support apparatus prompts again to select the next work item (step ST5). Here, it is assumed that the program designer selects the registration of the program parts (step ST9).

Figure 26:
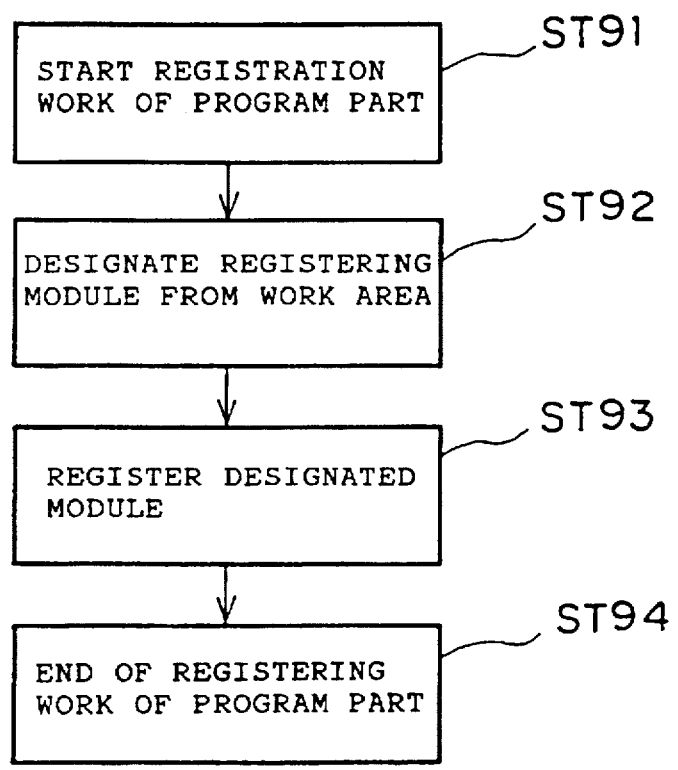
FIG. 26 is a flow chart showing a registering work of a program part.

In this connection, FIG. 26 is a flowchart showing the operation of the registration of the program parts.

The connection of the program parts, the edition of the program parts, and the preparation of the basic operation program parts have already been explained as above. Among these program parts, the designing support apparatus can register the program parts which have not yet been registered in the storage unit 13. Namely, when the program parts to be registered are designated by the command entering unit 11 or the data entering unit 12, the program parts managing unit 14 registers the program parts in the storage unit 13.

Accordingly, the performance of the recycle of the program parts in the designing support apparatus is improved.

When the registration of the program parts is thus finished, the designing support apparatus again prompts to select the next work item (step ST5). Here, it is assumed that the program designer selects the outputs of the program parts which have been converted into an executing type (step ST14).

Figure 27:
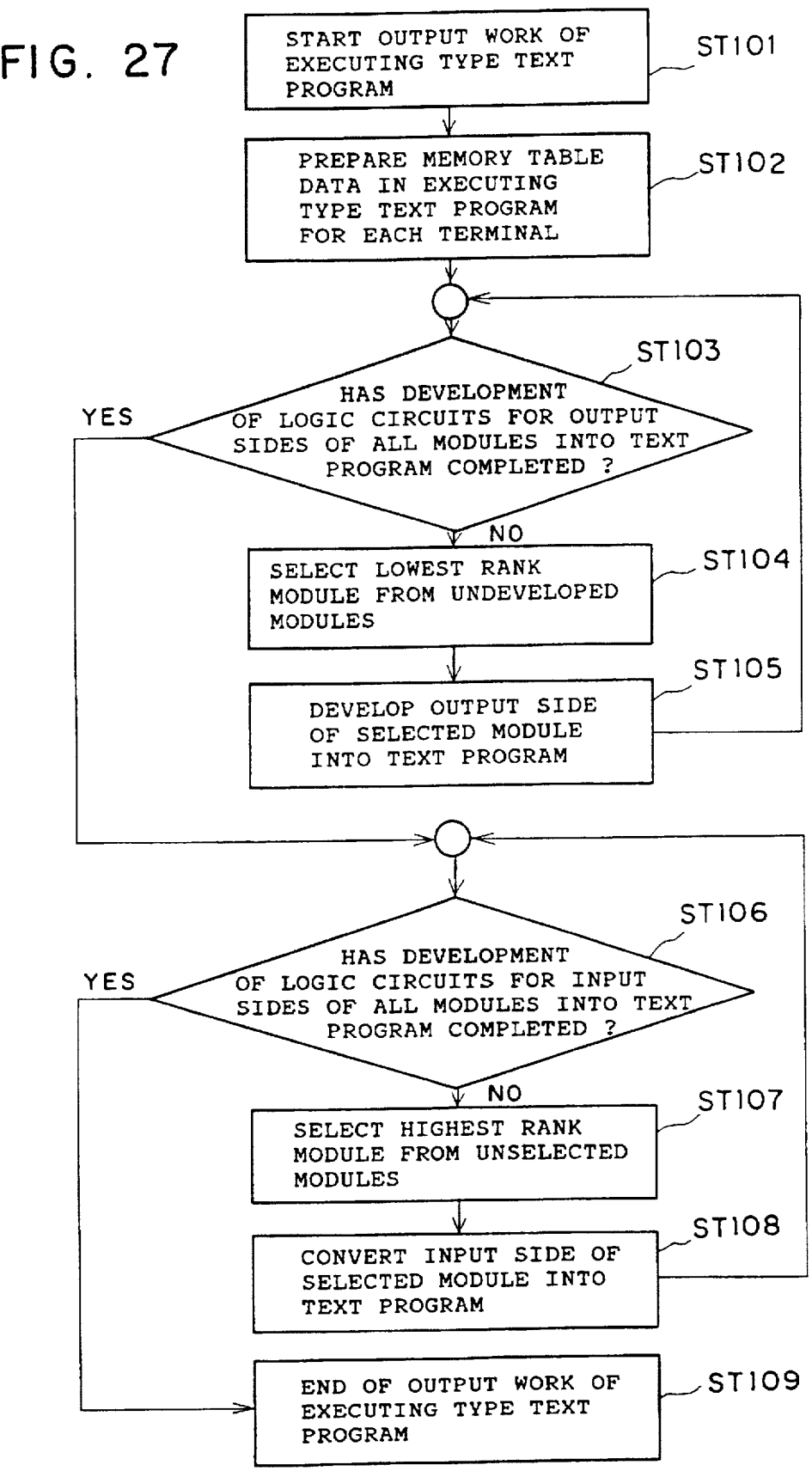
FIG. 27 is a flow chart showing a work for converting a program part into a text program to output.

In this connection, FIG. 27 is a flowchart showing the operation to convert the program parts into text programs and to output them.

In FIG. 27, first, in the conversion from the program parts into the text program parts, the executing sequence of each logic operator in the logic circuit realized by the program parts coupled by the program data managing unit 15 is determined. In other words, the data in the memory table in the executable program for each terminal is made to correspond to the terminal of each module of the coupled program parts.

Here, the memory table means a table in which the address on the executing machine corresponding to the terminal of each module is described.

The conversion of the program parts into the text program is carried out by the program converting unit 17 in the following sequence.

That is, first, at the output sides of all modules (the outputs from the lower-order modules), modules in which the logic circuits have not yet been developed into the text programs are sequentially selected from the lowest order module to develop them into text programs (steps ST103–105).

When all of the output sides are finished, then at the input sides of the modules, modules in which the logic circuits have not yet been developed into the text program are sequentially selected from the highest order module to develop them into text programs (steps ST106–109).

When the developments into the text programs are finished, the program converting unit 16 outputs the executable text programs to the program controller 8. The program controller 8 then controls the controlled subject 9 in accordance with the executable text programs.

Figure 28:
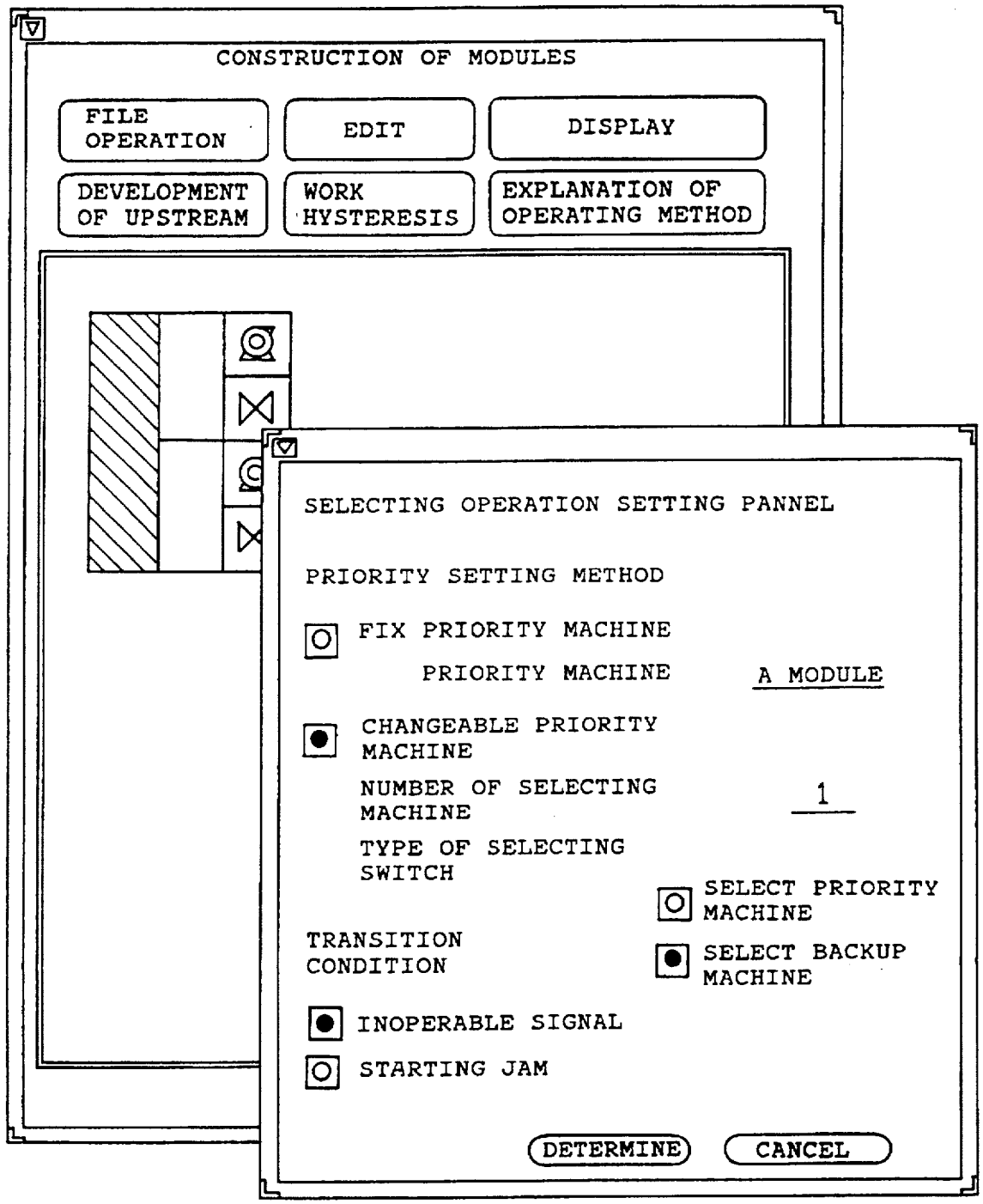
FIG. 28 is a diagram of a picture showing operations of required specification levels.

Other than the work items as described above, the designing support apparatus has work items such as an item to register the design contents of the program parts which have been designed in a halfway by the program designer (step ST11) or an item to read out the registered program parts 9 (step ST12). On the other hand, it is difficult to operate the designing support apparatus directly by the command entering unit 11. Therefore, as shown in FIG. 28, in order to make it possible to operate the designing support apparatus by using data of a required specification level from the data input unit 12, there is a command generating item (step ST15) for enabling the operation of the required specification level.

The present invention is not restricted to the above-described embodiments, but various modifications are possible without departing the spirit of the present invention.

As described above, according to the first aspect of the present invention, since the control program designing support apparatus is so constructed that, apart from the program parts for realizing the contents of the control for controlling each controlled subject, for each of the controlled subjects, program parts peculiar to controlled subject and for realizing the contents of the control without influencing on the control of the other controlled subjects are searched, and the searched program parts are hierarchically connected, there are effects in that the preparation of the program becomes easy or the like.

According to the second aspect of the present invention, since the control program designing support apparatus is so constructed that, when data indicating that a plurality of controlled subjects selected by the selecting means should be handled as one controlled subject is inputted from the selecting means, the plurality of controlled subjects are deemed as one controlled subject, and the program parts for realizing the contents of the control peculiar to the controlled subject are searched, there is an effect in that the performance of recycling the program can be improved.

According to the third aspect of the present invention, since the control program designing support apparatus is so constructed as to recognize, on the basis of the program parts combined by the program parts combining means, the logic of the contents of the control to be realized by the program parts, to recognize a logical connecting relationship of logic operators constructing the logic, and to evaluate the operating time of each of the logic operators on the basis of the logical connecting relationship, there is an effect in that the prepared program control logic can be verified.

According to the fourth aspect of the present invention, since the control program designing support apparatus is so constructed as to display, by using a time chart, the evaluation resulted by the timing evaluation means, there is an effect in that the verified result of the control logic of the prepared program can be easily recognized.

According to the fifth aspect of the present invention, since the control program designing support apparatus is so constructed as to display the evaluation resulted by the timing evaluation means as a point on a plural time axes coordinate plane consisting of two time axes representing an operation start time and an operation stop time respectively, there is an effect in that the verified result of the control logic of the prepared program can be easily recognized.

According to the sixth aspect of the present invention, since the control program designing support apparatus is so constructed as to recognize, on the basis of the evaluation resulted by the timing evaluating means, times of start and stop of the operation in each of the controlled subjects, and to display the operating state of each of the controlled subjects in accordance with the recognized times, there is an effect in that the change of the operating state of the controlled subject can be ascertained.

According to the seventh aspect of the present invention, since the control program designing support apparatus is so constructed as to display the contents of the control of the program parts searched by the program parts managing means as a logic diagram, to receive a correction requirement to correct the contents of the control, and to correct the contents of the control in accordance with the correction requirement if any, there are effects in that the contents of the control can be verified by a logic diagram level, and the contents of the control can be corrected in accordance with the necessity.

According to the eighth aspect of the present invention, since the control program designing support apparatus is so constructed that the program parts managing means registers the program parts which realize the contents of the control corrected by the editing means, there is an effect in that the performance of the modules for the program can be improved.

According to the ninth aspect of the present invention, since the control program designing support apparatus is so constructed that the program parts managing means registers the program parts that are combined by the program parts combining means, there is an effect in that the performance of the modules can be improved.

According to the tenth aspect of the present invention, since the control program designing support apparatus is so constructed as to prepare the program parts on the basis of points on a plural time axes coordinate plane inputted by plural time axes coordinate plane inputting means, there is an effect in that new program parts which have not yet been registered can be prepared.

According to the eleventh aspect of the present invention, since the control program designing support apparatus is so constructed as to execute the executable text program obtained by the conversion by the program converting means, there is an effect in that the efficiency of the program when is applied to a practical machine can be improved.

What is claimed is:

1. A control program designing support apparatus for designing a control program to control a plurality of inter-related controlled subjects comprising:

selecting means for selecting a plurality of controlled subjects and for specifying groups of controlled subjects as contents of control, the groups defining how each of said controlled subjects is to be controlled;

program parts managing means for searching a set of program parts corresponding to the plurality of controlled subjects as based upon searching data corresponding to said contents of the control, and for searching the set of program parts based upon searching data peculiar to each of the plurality of controlled subjects under independent control without influencing control of the other controlled subjects to obtain a set of output program parts;

program parts combining means for hierarchically combining the output program parts; and program converting means for converting the output program parts combined by said program parts combining means into an executable text program.

2. A control program designing support apparatus as claimed in claim 1, wherein data indicating that a plurality of controlled subjects selected by said selecting means should be handled as one controlled subject is inputted from said selecting means to said program parts managing means, said program parts managing means deems said plurality of controlled subjects as one subject, to search program parts which determine the control of the controlled subject.

3. A control program designing support apparatus as claimed in claim 1, further comprising timing evaluating means for recognizing, on the basis of the program parts combined by said program parts combining means, the connecting logic of said program parts, for recognizing a logical relationship of logic operators constructing said connecting logic, and for evaluating the operating time of each of said logic operators on the basis of the logical relationship.

4. A control program designing support apparatus as claimed in claim 3 further comprising time chart displaying means for displaying, by using a time chart, the evaluation resulted by said timing evaluation means.

5. A control program designing support apparatus as claimed in claim 3 further comprising plural time axes coordinate plane displaying means for displaying the evaluation resulted by said timing evaluation means as a point on a plural time axes coordinate plane consisting of two time axes representing an operation start time and an operation stop time respectively.

6. A control program designing support apparatus as claimed in claim 3 further comprising operation state displaying means for recognizing, on the basis of the evaluation resulted by said timing evaluating means, times of start and stop of the operation in each of said controlled subjects, and for displaying the operating state of each of said controlled subjects in accordance with the recognized times.

7. A control program designing support apparatus as claimed in claim 1 further comprising editing means for displaying the contents of the control of the program parts searched by said program parts managing means, for receiving a correction requirement to correct the contents of the control, and for correcting the contents of the control in accordance with said correction requirement if any.

8. A control program designing support apparatus as claimed in claim 7, wherein said program parts managing means registers the program parts which realize the contents of the control corrected by said editing means.

9. A control program designing support apparatus as claimed in claim 1, wherein said program parts managing means registers the program parts that are combined by said program parts combining means.

10. A control program designing support apparatus as claimed in claim 1 further comprising:

plural time axes coordinate plane inputting means for inputting the start times and the stop times of said controlled subjects as points on said plural time axes coordinate plane; and program parts preparing means for preparing the program parts on the basis of the points on the plural time axes coordinate plane inputted by said plural time axes coordinate plane inputting means.

11. A control program designing support apparatus as claimed in claim 1 further comprising program executing means for executing the executable text program obtained by the conversion by said program converting means.

* * * * *